United States Patent
Okamoto

(10) Patent No.: US 6,212,223 B1
(45) Date of Patent: Apr. 3, 2001

(54) DEMODULATION AND CORRELATION FOR SPREAD SPECTRUM COMMUNICATIONS

(75) Inventor: Naoki Okamoto, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/058,256

(22) Filed: Apr. 10, 1998

(30) Foreign Application Priority Data

Apr. 24, 1997 (JP) .................................................. 9-107821

(51) Int. Cl.[7] .............................. H04L 27/30; H04L 7/00
(52) U.S. Cl. ......................... 375/150; 375/142; 375/355
(58) Field of Search .................................. 375/150, 142, 375/355

(56) References Cited

U.S. PATENT DOCUMENTS

| | | | |
|---|---|---|---|
| 5,422,909 | * 6/1995 | Love et al. | 375/200 |
| 5,818,868 | * 10/1998 | Gaudenzi et al. | 375/206 |
| 5,896,423 | * 4/1999 | Okamoto | 375/345 |
| 5,920,589 | * 7/1999 | Rouquette et al. | 375/206 |

FOREIGN PATENT DOCUMENTS 8-316875   11/1996   (JP) .
9-298491   11/1997   (JP) .

OTHER PUBLICATIONS

Arthur G. Stephenson, "Digitizing Multiple RF Signals Requires an Optimum Sampling Rate", Electronics, Mar. 27, 1972, pp 106–110.*

* cited by examiner

Primary Examiner—Stephen Chin
Assistant Examiner—Paul N Rupert
(74) Attorney, Agent, or Firm—Nixon & Vanderhye, P.C.

(57) ABSTRACT

In a spread spectrum communications system, method and apparatus are provided for reducing transmission error and power consumption despite an increase in sampling. There are serially provided 4$k$ ($k$ denotes a spreading factor) shift registers (1) to (4) to deal with at most four samples to develop input spread signals, which are multiplied by spread-code replica signals from a replica generator. Sums $\pi 1$ to $\pi 4$ of respective $k$ products are obtained. An output of a correlator is obtained by further adding the sums. At this time, the shift registers (1) to (4), adders and the replica generator are controlled in response to a control signal depending upon the number of samples. When three samples are sampled for one chip, the shift register (4) is disabled and (1, 1, 1, −1, −1, −1, 1, 1, 1, 1, 1, 1, −1, −1, −1, NA, NA, NA, NA, NA) are prepared as a replica and only adder $\pi 4$ is disabled and an output of the correlator is obtained from signals stored in the shift registers (1), (2), (3).

15 Claims, 21 Drawing Sheets

FIG. 3A
(Prior Art)
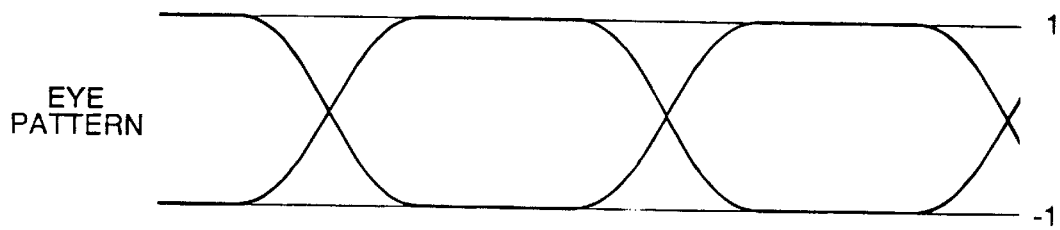
FIG. 3B
(Prior Art)
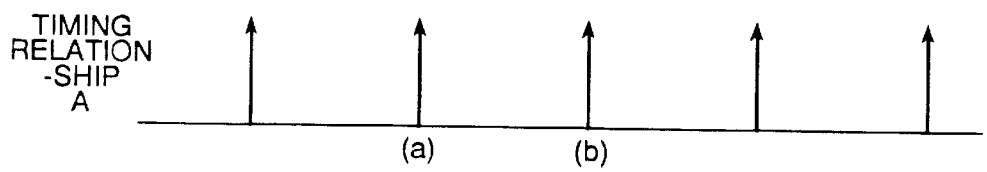
FIG. 3C
(Prior Art)
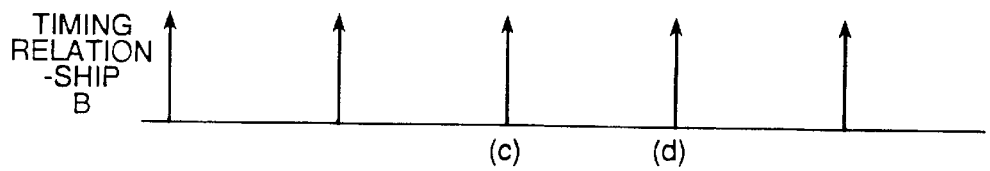
FIG. 3D
(Prior Art)

FIG. 15A
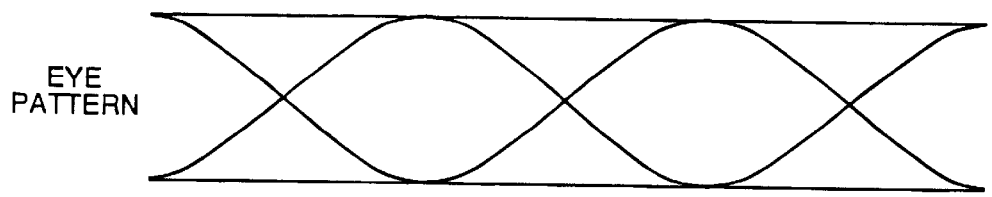
FIG. 15B SAMPLES
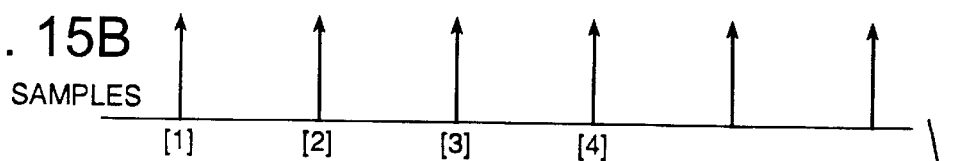
FIG. 15C CLOCK REGENERATION
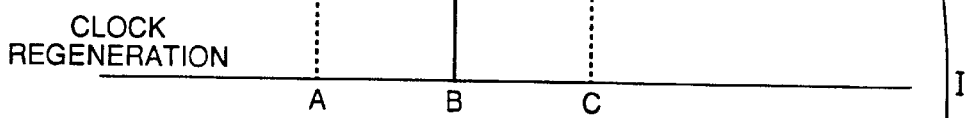
FIG. 15D MAG OUTPUTS
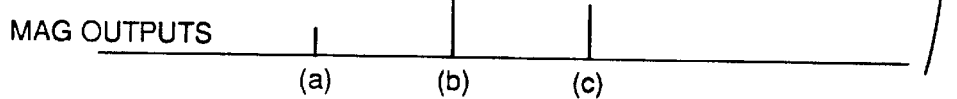
FIG. 15E SAMPLES
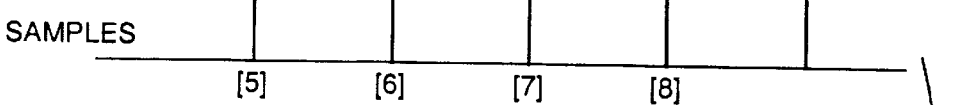
FIG. 15F CLOCK REGENERATION
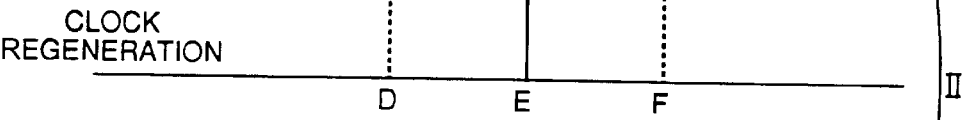
FIG. 15G MAG OUTPUTS
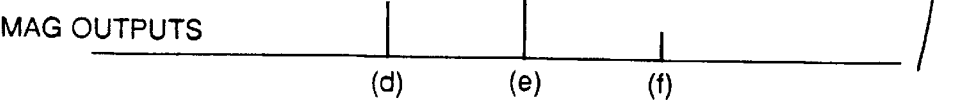

EYE PATTERN

SAMPLES

CLOCK REGENERATION

MAG OUTPUTS

SAMPLES

CLOCK REGENERATION

MAG OUTPUTS

EYE PATTERN

SAMPLES

[1] [2] [3] [4] [5] [6] [7] [8]

CLOCK REGENERATION

A B C D E

MAG OUTPUTS (a) (b) (c) (d) (e)

FOUR SAMPLES

SAMPLES

[9] [10] [11] [12] [13] [14] [15] [16] [17] [18]

CLOCK REGENERATION

F G H I J

MAG OUTPUTS (f) (g) (h) (i) (j) (k) (l)

FIVE SAMPLES

DEMODULATION AND CORRELATION FOR SPREAD SPECTRUM COMMUNICATIONS

BACKGROUND

1. Field of the Invention

The present invention relates to a wireless or wire communication, and in particular to a spread spectrum communication system using direct sequence spreading and a demodulator used in sampling received signals of the spread spectrum communication system.

2. Related Art and Other Considerations

Various modulation systems have conventionally been used for wireless data communications. Among them, the spread spectrum communication system has attracted attention.

The modulation systems which are commonly used for data communications are narrow-band width modulation systems which can be implemented by a relatively small circuit. These systems have a drawback of being sensitive to the multi-path or narrowband non-white noise indoors (in offices or factories and the like).

In contrast, the spread spectrum communication system is advantageous in that these drawbacks can be overcome by spreading the transmission spectrum of signals for carrying data with a spread-code (code used for spreading) so that the signals are transmitted at a broad-band width. Among the spread spectrum transmitting systems, the direct sequence (DS) spread system has been put into practice in some areas.

An example configuration of the direct spread spectrum communication system is described with reference to FIG. 1 and FIG. 2. FIGS. 1 and 2 show an exemplary configuration and are block diagrams illustrating the transmission and reception sides of a communication device used for the Direct Sequence Spread Spectrum DSSS communication system, respectively. This example shows a communication device for demodulating the signals which have been modulated by BPSK modulation techniques and transmitted.

On the transmission side, data to be transmitted from a data generating unit 101 is spread in a spreading unit 102 by using spreading codes which are generated by a spread-code generating unit 102c. The data is spread by a factor of k wherein k denotes the length of the spread-code. The data which was spread is referred to as "spread data". The unit of data to be transmitted is referred to as "one bit" and the unit of spread data is referred to as "one chip". In other words, one bit of transmitted data comprises k chips. Thereafter, the spread signal modulates an oscillation signal from a radio frequency (RF) oscillator 103s in a modulating unit 103 and is transmitted from an antenna via a radio frequency circuit (not shown).

On the receiving side, the transmitted signal is received by an antenna and is fed to a radio frequency circuit for converting it into an intermediate frequency (IF) signal. In the receiver, the received IF signal (see FIG. 2) is divided by a dividing-by-two splitter 104 into two signals which are input to respective multipliers 105 and 106. The two signals are converted into I and Q components of a base band signal by using cosine and sine components of a local signal from a local signal oscillator (VCO) 107. Alternatively, the conversion may be done by using a signal line and a phase-shifter for shifting one of the components of the local signal by 90 degrees.

The I and Q components of the base band are then sampled for quantization by analog to digital A/D convertors 108 and 109, respectively so that they are converted into digital data. The data are input into digital correlators 110 and 111 for establishing correlations for the respective data. The respective correlation outputs are fed to a timing detector 112 and latch circuits 113 and 114. The timing detector detects correlation spikes and causes respective correlation outputs to be latched in a timed relationship with the detected correlation spikes so that they can be demodulated by demodulator 115 to provide data.

In a receiver having the configuration of FIG. 2, sampling of plural samples such as two or three samples per one chip is conducted independently of the data and/or chip. This is due to the fact that a carrier to noise (C/N) ratio prior to despreading is very low and it is hard to conduct clock regeneration before despreading in the spread spectrum communication.

The correlators establish a correlation relationship by using all values of samples. Accordingly, a correlation is determined in the digital correlator by using values of 2k samples with two samples to one chip. The manner of sampling in the base band in this case is illustrated in FIG. 3A–FIG. 3D with reference to an eye pattern (FIG. 3A) based on a chip. Inherently, the eye is widest at the midpoint of the eye pattern and decreases its size as it becomes closer to the opposite ends thereof. The theoretical value of the error rate in the digital communication is generally a value which is measured at the midpoint of the eye pattern (refer to FIG. 3B).

An example in which two samples are sampled per chip is shown in FIG. 3A–FIG. 3D. A timing relationship A of FIG. 3C shows that the two samples (a) and (b) are substantially equally sampled with respect to the eye pattern. Although the eye is slightly smaller in amplitude than that at the midpoint in this case, both samples are valid. On the other hand, in the timing relationship B of FIG. 3D, sampling at sampling point (c) is carried out for the midpoint of the eye pattern so the amplitude is larger. Sampling at point (d) however, is carried out at a transition point of the chip, the value of the sampling point (d) being almost invalid.

Therefore, a problem occurs in the prior art that the sampling characteristics may deteriorate depending upon the sampling timing relationship if two samples are sampled per chip and independently of the timing relationship with the chip.

In accordance with the present invention, data in a communication system is serial/parallel-converted and spread in accordance with the same spreading code and multiplexed for communication. In this inventive system, spread signals are delayed and multiplexed for high rate transmission in a limited band. This inventive system uses a "delayed multiplexing technique". This system enables high rate transmission to be conducted in a limited band. Communication of data at 4 and 10 MBPS is possible when two and five signals are multiplexed, respectively.

An exemplary configuration of a transmitting system for a delayed multiplexing technique of the prior art is shown in FIG. 4. The data which is generated in a data generating unit 121 are coded as differential-valued data by a differential coding unit 122 and then converted into a number of parallel signals, the number of which is equal to the number of signals to be multiplexed by a serial to parallel (S/P) converting unit 123. The converted parallel signals are multiplied by a pseudo-random noise (PN) code from a PN generator 125 in multipliers 124-1 through 124-5 for spreading.

Subsequently, the spread signals are delayed by delay elements 126-1 through 126-5, respectively, and are mixed by a mixer 127 to provide a multi-valued digital signal, which modulates an oscillation signal from an RF oscillator 129 in a modulator 128. The modulated signal is frequency-converted by a frequency converting unit 130 and is transmitted via a power amplifying unit 131, etc.

High rate data communication is made possible by receiving and demodulating the signals which are multiplexed on the transmitting side of the communication system which has performed delayed multiplexing in such a manner as shown in FIG. 4.

An eye pattern for the delayed multiplexing system of FIG. 4 is shown in FIG. 5.

Since the signals to be transmitted are multi-valued signals as shown in an eye pattern in the delayed multiplexing system described herein, the error becomes larger, in comparison to errors of other points, if the samples are sampled at the transition points of the data.

If the normalized value of the eye pattern is assumed to be 1, the value of the eye pattern only changes in the range of 1 to −1 when multiplexing is conducted. The eye pattern only changes in the range of 1 to 0 at the transition position of the data. If multiplexing is conducted, the value of the eye pattern changes in the range of 1 to 5 as shown in FIG. 5. In this case, the value at the transition position changes from 1 to 3, causing substantial deterioration.

In order to avoid this deterioration, increasing the number of samples may be envisaged. This may be applied to the multiplexing configuration as shown in FIG. 4 as well as general code division multiple access (CDMA) communication in which multiplexing is conducted by spreading signals with different codes.

If there is one sample at the transition position of data when three samples are sampled to one chip, two of the samples would be valid. When three samples are sampled to one chip, two thirds of the samples would be valid. An improvement in characteristics can be correspondingly expected. If four samples are sampled to one chip, three fourths of the samples would be valid.

However, another problem may occur in that the power consumption will increase due to an increased number of samples.

An example configuration of a prior art correlator relying upon a plurality of samples is illustrated in FIG. 6. In FIG. 6, a reference numeral 116 denotes shift registers; 117 a replica-generating unit having spreading code data; 118-1 to 118-n are multipliers; 119 is an adder for adding the outputs from the multipliers 118-1 to 118-n. The correlator has, on its input side, shift registers 116, the number of which is equal to the number of samples for holding data of an input signal. Since the shift registers 116 require the circuits, the number of which is equal to the number of input signals for each of samples (for example, three and four circuits when one chip comprises three and four samples, respectively), its power consumption is high. Since most circuits comprise shift registers in the correlator, the power consumption for two samples is substantially half that for four samples.

BRIEF SUMMARY OF THE INVENTION

The present invention was made in view of the above-mentioned problems in the prior art of the direct sequence spread spectrum communication systems. It is an object of the present invention to achieve an improvement in characteristics by minimizing the power consumption which is increased as the number of samples is increased in a technique for sampling a plurality of samples, which is capable of decreasing the transmission error and improving the characteristics.

(1) One aspect of the present invention resides in a demodulating device for a direct sequence spread spectrum communication system having sampling means for sampling a given number of samples per chip from input spread signals in a base band area, which are directly spread with a spread-code. The demodulating device is adapted to perform despreading based upon discrete sample signals which are obtained by said sampling means for demodulation. In the sampling means the number of samples can be controlled in response to a control signal.

(2) Another aspect of the present invention resides in a correlator for a direct sequence spread spectrum communication system having sampling means for sampling a given number of samples per chip from input spread signals in a base band area, which are directly spread with a spread code. The correlator is adapted to determine a correlation between discrete sample signals by multiplying discrete sample signals which are obtained by said sampling means by a reference spread signal (prepared relevant to one code-length of said spread-signal for said discrete sample signals), and by adding the results of multiplication in each chip when demodulation is performed by conducting despreading based upon said discrete sample signals. The correlator comprises a number of in-series-connected shift registers which are inputted with said discrete sample signals, the number of which is equal to the maximum number of samples per chip. A replica signal generating means generates a number of replica signals, the number of which is equal to the number of samples per the same chip as replica of said reference spreading signal.

(3) Another aspect of the present invention resides in a correlator for a direct sequence spread spectrum communication system having sampling means for sampling a given number of samples per chip from input spread signals in a base band area, which are directly spread with a spread code. The correlator is adapted to determine a correlation between discrete sample signals by multiplying discrete signals which are obtained by said sampling means by a reference spreading signal (prepared relevant to one code-length of said spread-code for said discrete sample signals) and by adding the results of multiplication in each chip when demodulation is performed by conducting despreading based upon said discrete sample signals. The correlator comprises a number of in-parallel-connected shift registers which are inputted with said discrete sample signals, the number of which is equal to the maximum number of samples per chip. A replica signal generating means generates a number of replica signals, the number of which is equal to the number of samples per the same chip as replica of said reference spreading signal.

(4) Another aspect of the present invention resides in a demodulating device for a direct sequence spread spectrum communication system as mentioned in (1) above, in which a control signal is generated for controlling the number of samples per chip depending upon a multi-valued number of the signal level of said input spread signals.

(5) Another aspect of the present invention resides in a demodulating device for a direct sequence spread spectrum communication system as mentioned in (1) above, wherein a signal in a predetermined data format (including a non-multiplexed portion containing data for defining the communication format, etc., which is followed by a multiplexed portion) is input as the input spread signal. A control signal for controlling the number of samples (which is preset in said non-multiplexed portion) or a control signal for controlling the number of samples (depending upon the multi-valued number which the signal level of multiplexed spread signal has in the multiplexed portion) is generated as a control signal for controlling the number of samples.

(6) Another aspect of the present invention resides in a demodulating device in the direct spread spectrim communication system as mentioned of (4) above, in which when a signal in a predetermined data format including a non-multiplexed portion containing data for defining the communication format, etc., which is followed by a multiplexed portion is input as said input spread signals, a control signal for controlling the number of samples is generated by using a multi-valued number which is obtained by identifying the multi-valued number which has been incorporated in said non-multiplexed portion.

(7) Another aspect of the present invention resides in a demodulating device in the direct spread spectrum communication system having means for sampling a given number of samples to one chip from input spread signals in a base band area, which are directly spread with a spread-code, said demodulating device being adapted to perform despreading based upon discrete sample signals which are obtained by said sampling means for demodulation, in which said demodulating device comprises sample signal selecting means for selecting a number of samples, the number of which is less than a given number of samples of each chip from the discrete sample signals which are obtained by sampling of said sampling means to despread only sample signals which are selected by said sample signal selecting means for demodulation.

(8) Another aspect of the present invention resides in a demodulator device in the direct spread spectrum communication system as mentioned of (7) above, in which said sample signal selecting means selects sample signals in such a timing relationship that a correlation signal is generated, which is detected in a clock regenerating circuit for regenerating sampling clock signals based upon despread signals which are obtained by adding correlation signals based on all sample signals which are sampled by said sampling means.

(9) Another aspect of the present invention resides in a demodulating device in the direct spread spectrum communication system as mentioned of (8) above, in which said despread signals which are obtained by adding correlation signals based on said all sample signals are obtained by adding signals which are obtained by despreading sample by sample a given number of sample signals of each chip, which are obtained by said sampling means.

(10) Another aspect of the present invention resides in a demodulator device in the direct spread spectrum communication system as mentioned of (8) or (9) above, in which when despreading is performed by sampling an even number of samples to one chip and by using a passive type of correlator, a sample signal is selected which corresponds to larger one of previous and subsequent correlation magnitude (MAG) outputs with respect to the midpoint of a timing interval in which correlation signals which are detected by said clock regenerating circuit are generated.

(11) Another aspect of the present invention resides in a demodulator device in the direct spread spectrum communication system as mentioned of (8) or (9) above, in which when despreading is performed by sampling an odd number of samples to one chip and by using a passive type of correlator, discrete sample signals are selected in a clock timing relationship in which correlation signals which are detected by said clock regenerating circuit are generated.

(12) Another aspect of the present invention resides in a demodulating device in the direct spread spectrum communication as mentioned of any one of (8) to (11) above, in which said clock regenerating circuit comprises correlation signal integrating means for detecting the timing relationship in which correlation signal are generated and integrating means for selecting sample signals, which is separate from said integrating means for clock generating.

(13) Another aspect of the present invention resides in a demodulating device in the direct spread spectrum communication system as mentioned of (12) above, in which the number of integration operations depending upon the discrete sample signals which are performed in said integrating means for selecting sample signals is determined and preset as a function of data rate and spreading rate, based upon the accuracy of an oscillator used in said communication system.

(14) Another aspect of the present invention resides in a demodulating device in the direct spread spectrum communication system as mentioned of any one of (7) to (13) above, in which when signals which have been spread by using the same spread-code, delayed and multiplexed are input as said input spread signals, the sample signals which are selected depending upon the operation of said sample signals are changed each block unit of said delayed and multiplexed signals so that the condition of selecting of the sample signals is maintained for a period of said block unit.

(15) Another aspect of the present invention resides in a demodulating device in the direct spread spectrum communication system in which the sampling means of the demodulator device in the direct spread spectrum communication system as mentioned of any one of (1), (4), (5) and (6) above is used as sampling means of the demodulating device in the direct spread spectrum communication system as mentioned of any one of (7) to (14) above.

In accordance with the present invention, the number of samples can be preset in view of power consumption and characteristics by means for changing the number of samples in response to a control signal.

Further, in accordance with the present invention, a number of shift registers, the number which is equal to the maximum number of samples are in series connected to each other and corresponding number of replicas are generated. The number of samples is changed in response to an externally provided control signal.

If the transmitted signals have multi-valued signal levels to which several spread signals are added, optimal characteristics could be obtained for each multi-valued number by changing the number of samples to be controlled depending upon the multi-valued number.

In a system for transmitting plural series of signals which are multiplexed by delaying desired several chips by desired several chips signals which are spread with the same spreading code as that of a non-multiplexed portion in a data format, optimum characteristics can be obtained over both non-multiplexed portion and multiplexed portion by changing the number of samples between non-multiplexed and multiplexed portions. Alternatively, signals carrying the number of signals to be multiplexed may be transmitted and the number of signals to be multiplexed is identified on the receiving side. The number of samples can be switched from the multiplexed portion depending upon the identified number of signals to be multiplexed.

Demodulation can be performed only in an region having a better S/N ratio by using one sample or m samples per chip of signals which are sampled by sampling several samples (k samples) (k>m) per one chip.

Using a clock regenerating circuit for regenerating clock by using despread signals which are obtained by adding all samples makes it possible to select much better region having a much better C/N ratio.

In the foregoing invention, a circuit can be commonly used by obtaining the despread signals by adding signals which are despread one sample by one sample.

If an even number of samples (for example, two samples per one chip) are sampled, a larger MAG output is selected from previous and subsequent samples with respect to the midpoint of an eye pattern. A sample which is in a region having a better C/N ratio of an eye pattern can be positively selected by selecting previous or subsequent sample if the previous sample is larger than the subsequent sample or vice versa.

If an odd number of samples (for example, three samples per one chip) are sampled, a region of an eye pattern having a better signal to noise (S/N) ratio can be positively selected by performing sampling in the timing relationship of clock regeneration.

The integration for selection can be switched more rapidly by being replaced with the integration for clock regeneration.

The number of integration operations can be switched depending upon the system with reference to the accuracy of the oscillator used for the communication system, data rate and spreading rate.

Cancellation of cross interference can be performed in an excellent manner by selecting each unit of multiplexed block in a system in which transmitted and received signals are multiplexed.

A system having a low power consumption and excellent characteristics can be built by combining a method of selecting signals used for demodulation from sampled signals with the method of selecting the number of samples.

BRIEF DESCRIPTION OF THE DRAWINGS

FIG. 3A–FIG. 3D are time charts showing the timing relationship between the eye pattern of the base band signal and sampled signals.

FIG. 15A–FIG. 15G are time charts showing an eye pattern of base band signals, sample signals, clock regeneration and magnitude (MAG) outputs in operation of the correlator of the present invention.

DETAILED DESCRIPTION OF THE DRAWINGS

The present invention relates to a wireless or wire communication and in particular to a spread spectrum communication system using direct sequence spreading and a demodulator used in the spread spectrum communication system according to sampling received signals, which may be widely used for digital data communication.

Figure 6:
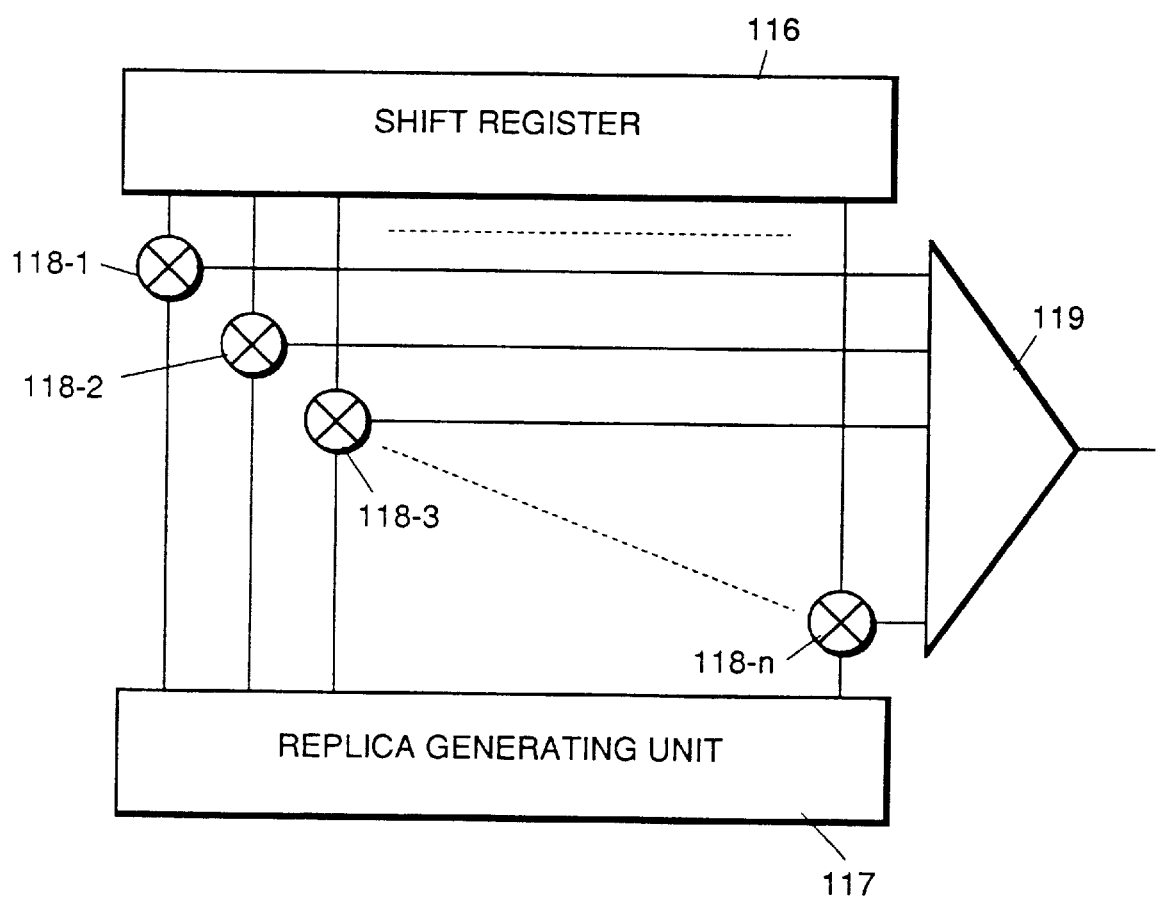
FIG. 6 is a circuit block diagram showing an example of the configuration of a prior art correlator using a plurality of samples.
Figure 7:
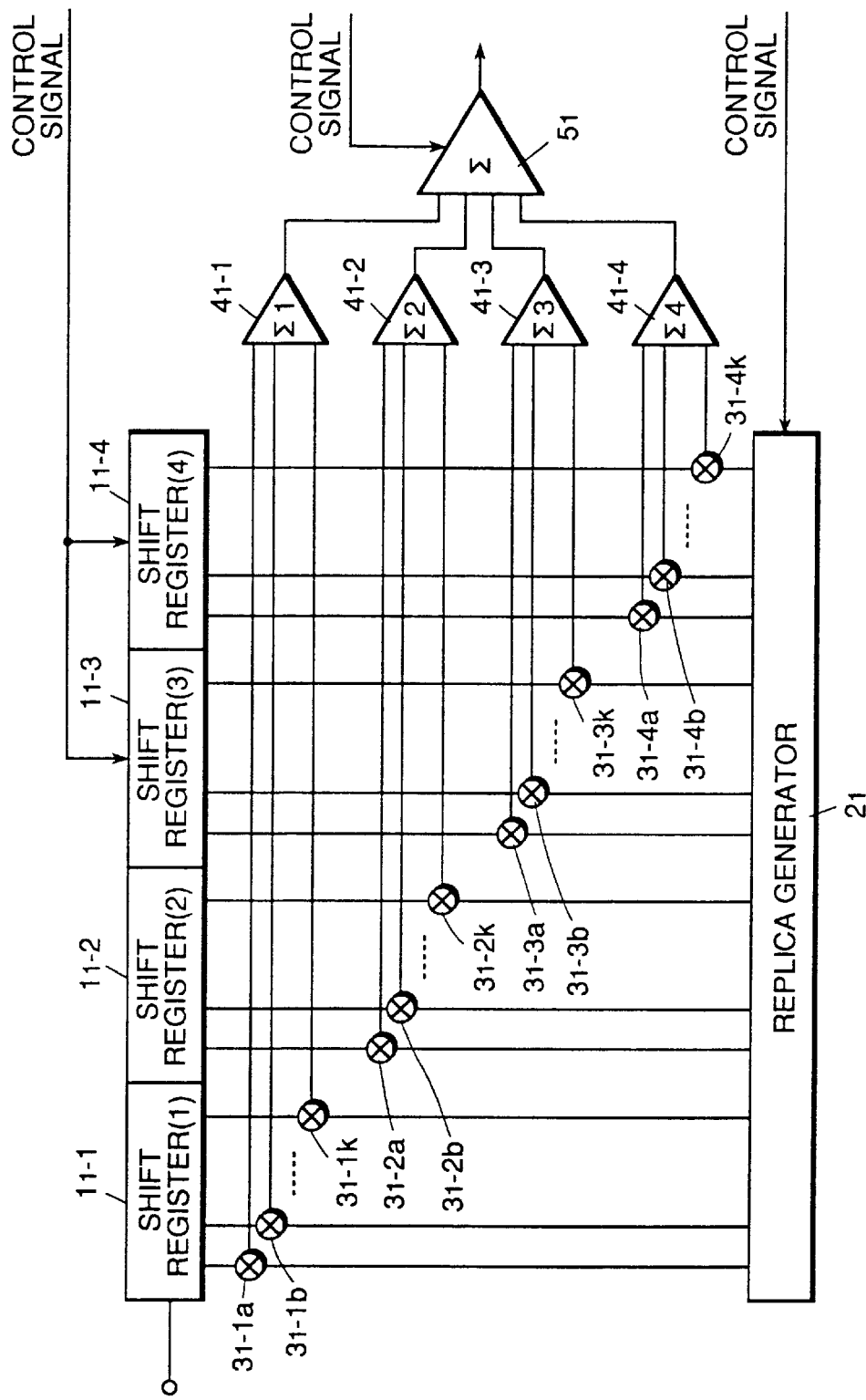
FIG. 7 is a circuit block diagram showing the configuration of an embodiment of a correlator of the present invention.

FIG. 7 shows the configuration of one embodied circuit of a correlator of the present invention. But prior to a description of the correlator of FIG. 7, the configuration of the circuit of the above-mentioned prior art correlator shown in FIG. 6 is described. In the prior art correlator of FIG. 6, sampled incoming base band signals are successively stored in the shift registers 116. If two samples are sampled to one chip, for one bit of data of the input signal the number of the shift registers would be $2k$ (k represents the spreading factor). If the input signal is a multi-bit digital signal, the number of the shift registers would be multiplied by the number of bits.

The signal which is stored in each of the shift registers is multiplied by a replica 117 in each of the multipliers 118-1 to 118-n. The replica 117 is a spread-code per se. If two samples are sampled to one chip, the signal is multiplied by the same code two times, as follows (1,2), (3,4), (5,6) . . . so on. Specifically, if the spread-code is (1, −1, 1, 1, −1), the replica would be (1, 1, −1, −1, 1, 1, 1, 1, −1, −1).

In accordance with one embodiment of the invention, the number of samples can be changed in response to a control signal. An example in which the number of samples can be selected among three numbers, such as 2, 3, 4 is shown in FIG. 7. In FIG. 7, a sampled one bit data input signal is input to the shift registers (1) $1_1$-1 to (4) $1_1$-4. The length of the shift registers (1) $1_1$-1 to (4) $1_1$-4 is a value obtained by multiplying the length of the spread-code by the maximum number of samples to one chip. In FIG. 7, 4k shift registers (1) $1_1$-1 to (4) $1_1$-4 are provided so that for each data bit of input signal, at most four samples will be sampled per chip wherein k denotes the spreading factor (or the number of chips). The signal which is stored in each of the shift registers (1) $1_1$-1 to (4) $1_1$-4 is multiplied by a replica signal from a replica generator 21. Addition of k products (($\Sigma$1 at adder $4_1$-1) through ($\Sigma$4 at adder $4_1$-4)) is conducted for each sample. The results of addition are all added by an adder $5_1$ to provide an output of the correlator. The shift registers (1) $1_1$-1 to (4) $1_1$-4, multipliers $3_1$-1a to 1k, $3_1$-2a to 2k, $3_1$-3a to 3k, $3_1$-4a to 4k, and the replica generator $2_1$, can be controlled by control signal.

Operation of each unit when the number of samples is 2, 3, 4 will be described in detail.

When two samples are sampled to one chip, the shift registers (3) $1_1$-3, and (4) $1_1$-4 are disabled by the control signal. Each of the shift registers (1), (2), (3) and (4) comprises a unit block with k elements. (1, 1, −1, −1, 1, 1, 1, 1, −1, −1, NA, NA, NA, NA, NA, NA, NA, NA, NA, NA) is provided by replica generator $2_1$, wherein NA represents that the state may be any of (1, 0, −1). The adders (1) 4-1 and (2) $4_1$-2 are enabled while the adders (3) $4_1$-3 and (4) $4_1$-4 are disabled. As a result, only signals which are stored in the shift registers (1) $1_1$-1 and (2) $1_1$-2 are multiplied by replicas (for two samples to one chip) in multipliers $3_1$-1a to k and $3_1$-2a to k, respectively and added and output so that an output of the correlator which is equivalent to that of the prior art can be obtained.

When three samples are sampled to one chip, only the shift register (4) $1_1$-4 is disabled by the control signal. (1, 1, 1, −1, −1, −1, 1, 1, 1, 1, 1, −1, −1, −1, NA, NA, NA, NA, NA) is provided as the replica 21. Only the adder ($\Sigma$4) $4_1$-1 is disabled. As a result, only signals stored in the shift registers (1), (2) and (3) are multiplied by a replica 21 (three samples to one chip) and the products are added to provide a correlator output.

When four samples are sampled to one chip, all the shift registers (1) to (4) are enabled. (1, 1, 1, 1, −1, −1, −1, −1, 1, 1, 1, 1, 1, 1, 1) is provided as the replica 21. The adders ($\Sigma$1) to ($\Sigma$4) are all enabled. As a result, signals which are stored in the shift registers (1), (2), (3) and (4) are multiplied by replica $2_1$ (for four samples to one chip) added to provide an output of the correlator.

In such a manner, the present invention enables the number of samples per chip to be selectively changed. Accordingly, the shift registers and adders can be selectively used depending upon the number of samples, for example, 1 to 4. A four sample system can be used when better characteristics are required. The four sample system can be converted into two sample system when low power consumption is preferable even if the characteristics are slightly deteriorated. In connection with such conversion, the circuits which are disabled are not supplied with clock signal, thereby cutting power consumption in half.

Figure 8:
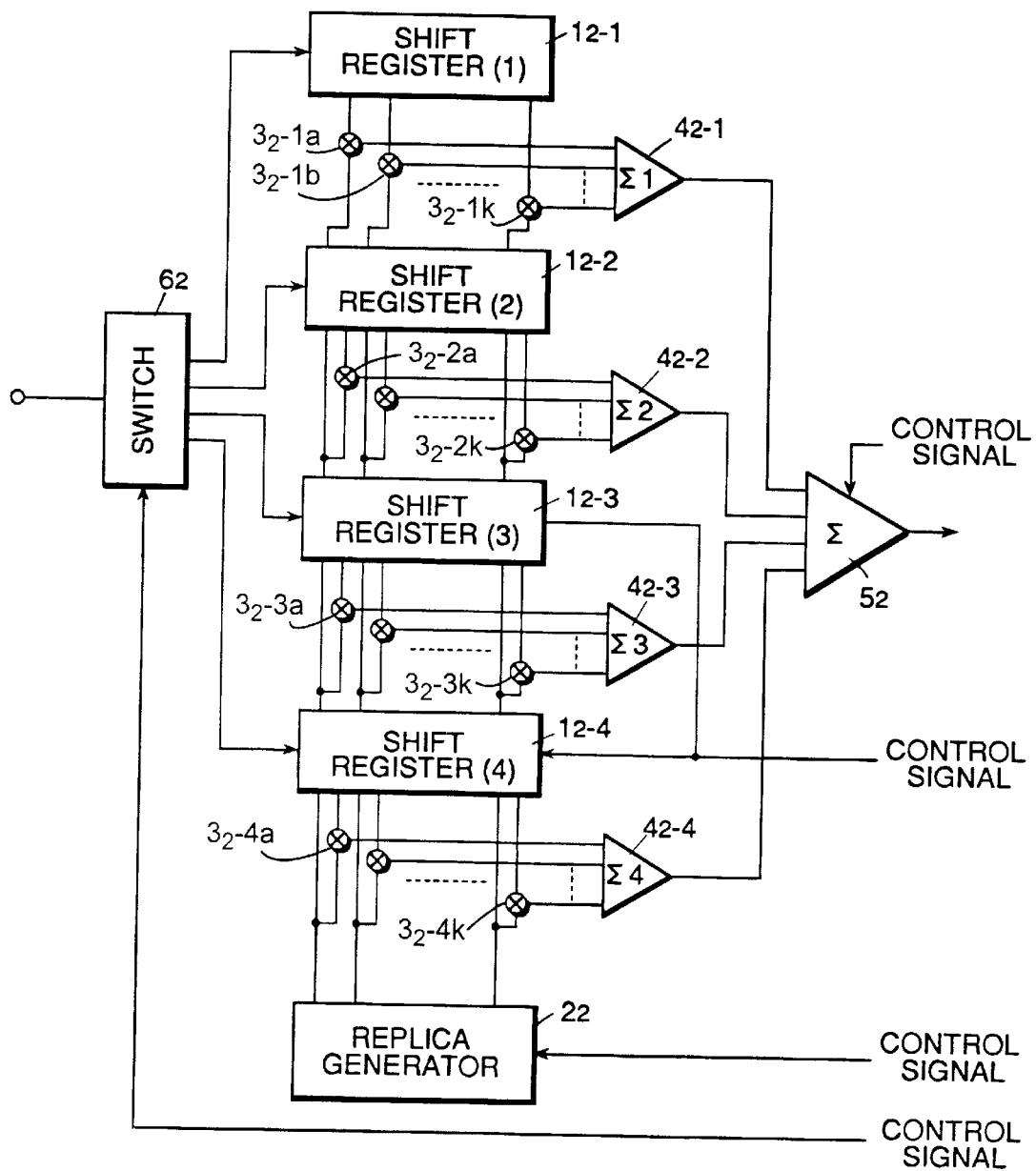
FIG. 8 is a circuit block diagram showing the configuration of an embodiment of another correlator of the present invention.

The configuration of an embodied circuit of another correlator of the present invention is shown in FIG. 8. In FIG. 8, the sampled input signals are input to the shift registers (1) $1_2$-1 to (4) $1_2$-4 via a switch $6_2$. The length of each of the shift registers is the same as that of spread-code. In FIG. 8, 4k shift registers are provided so that at most four samples will be sampled. The switch $6_2$ switches the sampled signals every sampling so that the signals are successively input to the shift registers (1) $1_2$-1 to (4) $1_2$-4. The signal which is stored in each of shift registers (1) to (4) is multiplied by a replica signal from a replica generator $2_2$ and addition ($\Sigma$1) to ($\Sigma$4) of k products (k denotes the spreading factor) is conducted. The results of addition are all added by an adder 52 to provide an output of the correlator. The shift registers (1) to (4), adders $3_2$-1a to 1k, $3_2$-2a to 2k, $3_2$-3a to 3k, $3_2$-4a to 4k, and the replica generator $2_2$, can be controlled by control signal.

Operation of each unit when the number of samples is 2, 3, 4 will be described in detail.

When two samples are sampled to one chip, the switch $6_2$ alternatively switches the shift registers in response to a control signal so that signals are input to only the shift registers (1) $1_2$-1 and (2) $1_2$-2. Thus, odd and even number samples are input to the shift registers (1) and (2), respectively. It is assumed that the replica signal from the replica generating unit $2_2$ is based upon the same spread-code as in the foregoing case, i.e. (1, −1, 1, 1, −1). The adders ($\Sigma$1) $4_2$-1 and ($\Sigma$2) $4_2$-2 are enabled while the adders ($\Sigma$3) $4_2$-3 and ($\Sigma$4) $4_2$-4 are disabled. As a result, only signals which are stored in the shift registers (1) and (2) are multiplied by replicas in multipliers $3_2$-1a to k and $3_2$-2a to k, and added by adder $5_2$ and output so that an output of the correlator can be obtained.

When three samples are sampled to one chip, the switch $6_2$ successively switches the shift registers (1), (2) and (3) so that spread signals are input thereto. On the other hand, the shift register (4) is disabled by its control signal. Similarly as before, (1, −1, 1, 1, −1) is provided in the replica generator $2_2$. The adder ($\Sigma$4) $4_2$-4 is disabled. As a result, only the signals stored in the shift registers (1), (2) and (3) are multiplied by replica signals and the products are added by adder $5_2$ and output.

When four samples are sampled for one chip, the switch successively switches the shift registers (1), (2), (3) and (4) in response to a control signal so that spread signals are input thereto. The replica signal (1, −1, 1, 1, −1) is provided in the replica generator $2_2$. As a result, the signals stored in the shift registers (1), (2), (3) and (4) are multiplied by the replica and the products are added by adder $5_2$ and output.

In such a manner, the present invention enable the number of samples per chip to be selectively changed. Accordingly, the shift registers and adders can be selectively used depending upon the number of samples, for example, 1 to 4.

Figure 9:
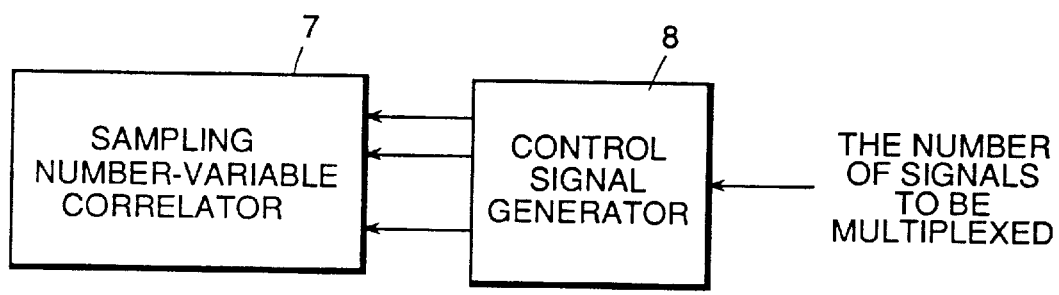
FIG. 9 is a circuit block diagram showing an example of the configuration adapted to the multiplexing system of the present invention.

An embodiment of a sample number variable correlator in the direct spread spectrum system using multiplexing will be described with reference to FIG. 9. In this embodiment, the above-mentioned sampling-number-variable correlator 7 is provided with a control signal generator 8 for determining the number of samples used for demodulation depending upon the number of signals to be multiplexed.

As mentioned above as problems in the prior art, there exists given number of samples, at which a trade off between the characteristics and power consumption is determined by the number of signals to be multiplexed in the multiplexed communication system.

Increasing the number of samples enhances the error rate characteristics, but increases power consumption. If the present system is used as a portable terminal, etc., the power consumption is a critical factor since it determines the battery drive period of time.

Since an error rate which is generally necessary has been determined, both requirements for decreased power consumption and reduction in error rate can be satisfied by decreasing the number of samples so far as the error rate will not exceed the necessary value.

For example, two, three and four samples are sampled when the number of the signals to be multiplexed is one; two or three; and four or five, respectively. Combinations of the number of the signals to be multiplexed with the number of samples corresponding to necessary error rates are preliminarily determined. The sampling-number-variable correlator 7 is supplied with a control signal from a control signal generator 8 by providing the number of signals to be multiplexed. As a result, the number of samples can be chosen for each number of signals to be multiplexed so that optimum demodulation can be achieved without wasting power.

Another embodiment of the demodulating device according to the present invention utilizes a delayed multiplexing method for spreading signals using (1) the same spread-code and (2) a communication system having a non-multiplexed portion (simplex) and a multiplexed portion. In this embodiment, the number of samples is changed between non-multiplexed and multiplexed portions. A data format which is used in this embodiment is shown in FIG. 10.

Figure 10:
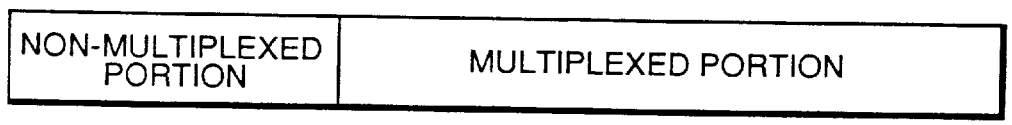
FIG. 10 is a view showing a data format having a non-multiplexed portion and multiplexed portion which is processed in a system using a demodulating device of the present invention.

In the FIG. 10 embodiment, the number of samples per chip is switched when the non-multiplexed portion is changed to a multiplexed portion, i.e. when the signal changes from being non-multiplexed to multiplexed, and visa versa.

In an example case for the FIG. 10 embodiment, if information for starting wireless line connection (synchronization signal, packet length, etc.) is inserted in a non-multiplexed portion, it may be desired to reduce error to as value as low as possible since the information is important. Accordingly, in such case demodulation is conducted without causing any error by maximizing the number of samples and the characteristics.

Alternatively, in the FIG. 10 embodiment the number of samples per chip, which depends on the number of the signals to be multiplexed, is selected on the multiplexed portion, i.e. carried in the multiplexed portion of the input signal. As a result, optimized demodulation can be performed.

Alternatively, another method using two samples on the non-multiplexed portion can be envisaged. If the approximately same error rate is required on the non-multiplexed as multiplexed portions, power consumption in the non-multiplexed portion can be reduced by decreasing the number of samples to 2 on the non-multiplexed portion.

Thus, in one embodiment, data on the number of signals to be multiplexed is embedded in a non-multiplexed portion, so that the number of signals to be multiplexed on the multiplexed portion is demodulated based upon the embedded data. This aims at assuring a transmission rate by flexibly changing the number of signals to be multiplexed depending upon the electromagnetic environment.

Therefore, in this embodiment, a fixed number of samples per chip are taken for the non-multiplexed portion of the input signal and the number of samples per chip taken for the multiplexed portion is based upon the data embedded in the non-multiplexed portion. The present embodiment is only different from the former embodiment in that the number of signals to be multiplexed has been predetermined while it is embedded in the non-multiplexed portion.

Figure 11:
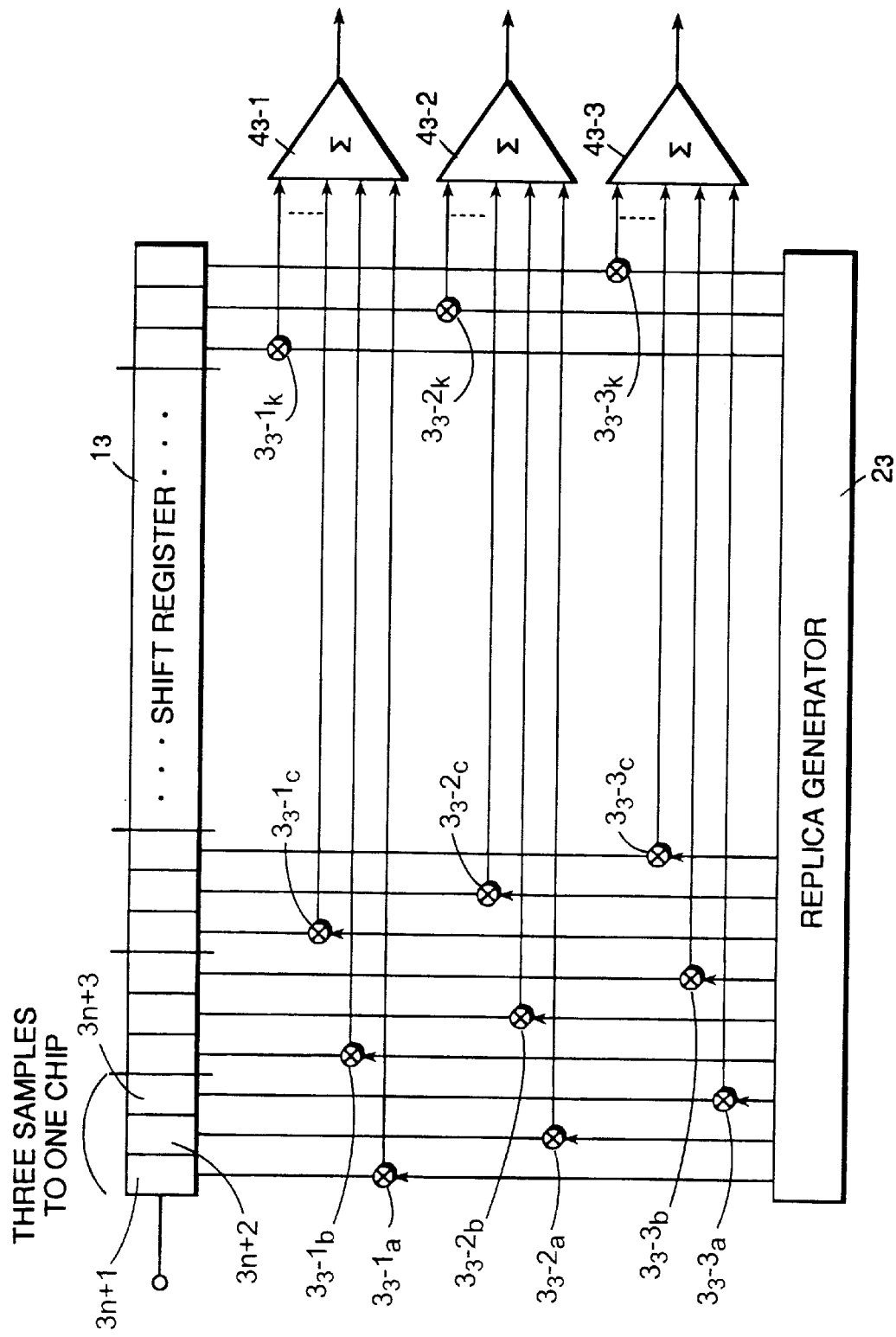
FIG. 11 is a circuit block diagram showing the configuration of a further correlator of the present invention.

FIG. 11 shows the configuration of the correlator in another embodiment in which three samples are sampled per chip.

In FIG. 11, the three samples 3n+1, 3n+2, 3n+3 (n:0, 1, . . ., k) in each of the total k chips of an input data byte, stored in a shift register 13, are sequentially multiplied in multipliers $3_3$-$1a$ to $3_3$-$3k$ by replica signals from a replica generator $2_3$. The products are added in adders $4_3$-1 to $4_3$-3. One of the sums is selected, without conducting further adding, and that selected sum is used for demodulation. Since the data is uncertain at its transition position as mentioned above with reference to FIG. 3, an improvement in characteristics can be achieved by using only the result of addition in the correlator, which is obtained by using a sample of three samples in the widest area of the eye pattern.

Sampling at the midpoint of the eye pattern is optimal. However, the timing relationship of sampling is indefinite since sampling is conducted independently of clocking on the transmission side. The timing relationship changes with time due to the difference between clock frequencies on the receiving and transmission sides. Therefore, it is hard to conduct sampling at the midpoint of the eye pattern. Accordingly, it may be envisaged that better characteristics are obtained by selecting a sample at a wider eye pattern area among samples.

In the present embodiment, only one sample at the widest area of the eye pattern per chip is selected out from several samples per chip. The selecting is below described with reference to Japanese Laid-open Patent Publication (TOKKAI HEI) No. 8-316875 entitled "Clock regenerating circuit" by the inventors of the present application.

Figure 12:
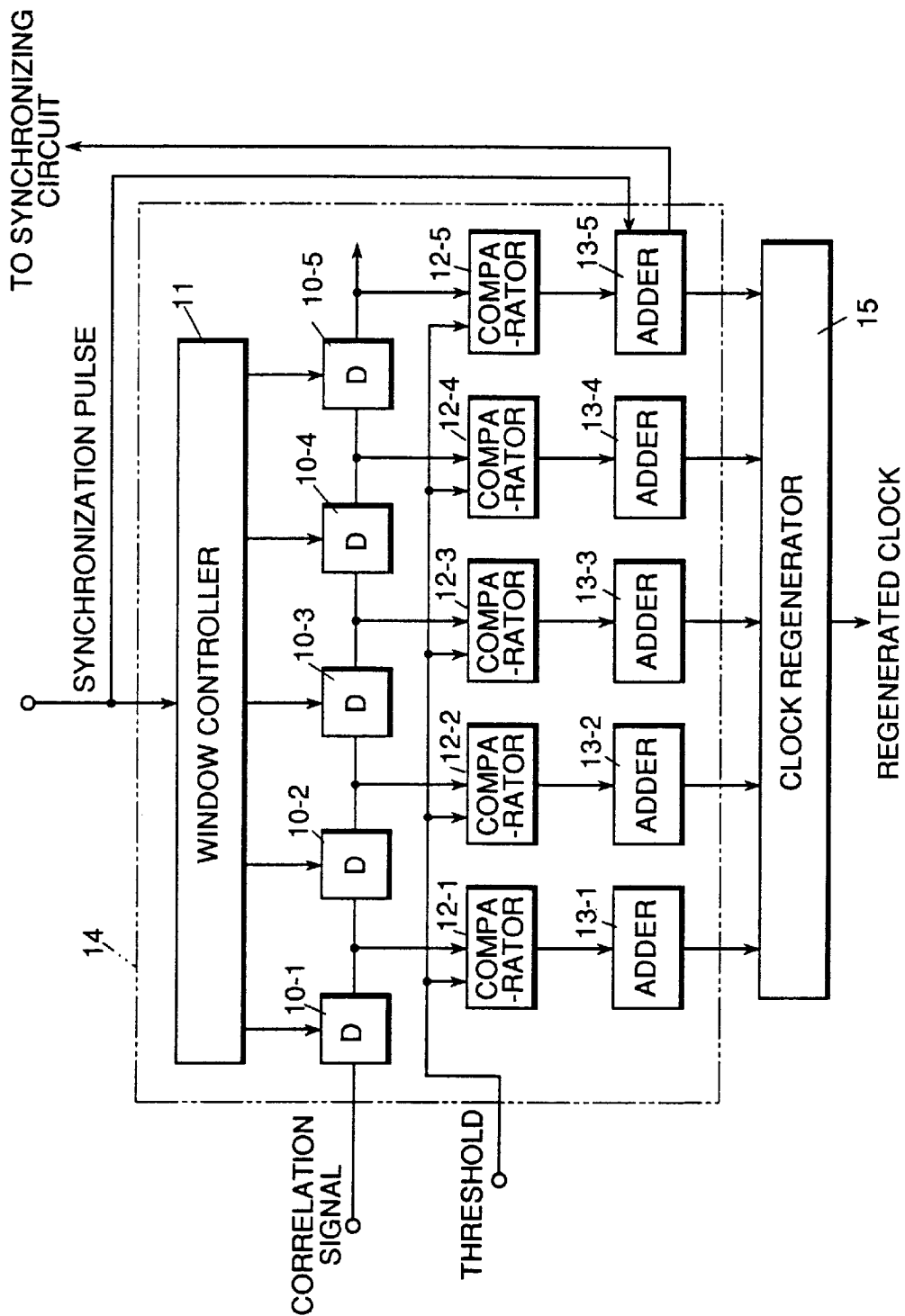
FIG. 12 is a circuit block diagram showing the configuration of a clock regenerating circuit which is used for selecting sampling clock signal in correlation processing in accordance with the present invention.

FIG. 12 is a block diagram showing a clock regenerating circuit used in the present embodiment. Correlation signals from a correlator (not shown in FIG. 12) are spread over a time axis by means of delays 10-1 to 10-5 (for example, shift registers). It is assumed that sampling is conducted with two samples per chip.

The input correlation signal herein may be a correlation signal in accordance with any prior art technique.

Clock regeneration is based on synchronization pulses. A window control unit 11 is controlled by the synchronization pulses and by correlation signals (of several samples in front of and in rear of the window) which are gated by the control unit 11.

The clock is regenerated based upon the synchronization pulses of a synchronization circuit with correlation signals (not shown in FIG. 12). The shift of clocks between transmitting and receiving sides is compensated for by a tracking circuit using a window.

The correlation signals in the window (time window) are compared with thresholds which are preset for respective samples by comparators 12-1 to 12-5. These comparators output signals 1 or 0 as the result of the comparison. Thereafter, the output signals are added by adders 13-1 to 13-5. The regenerated clock is controlled by clock regenerator 15 in response to overflow signals from the adders 13-1 to 13-5.

Figure 13:
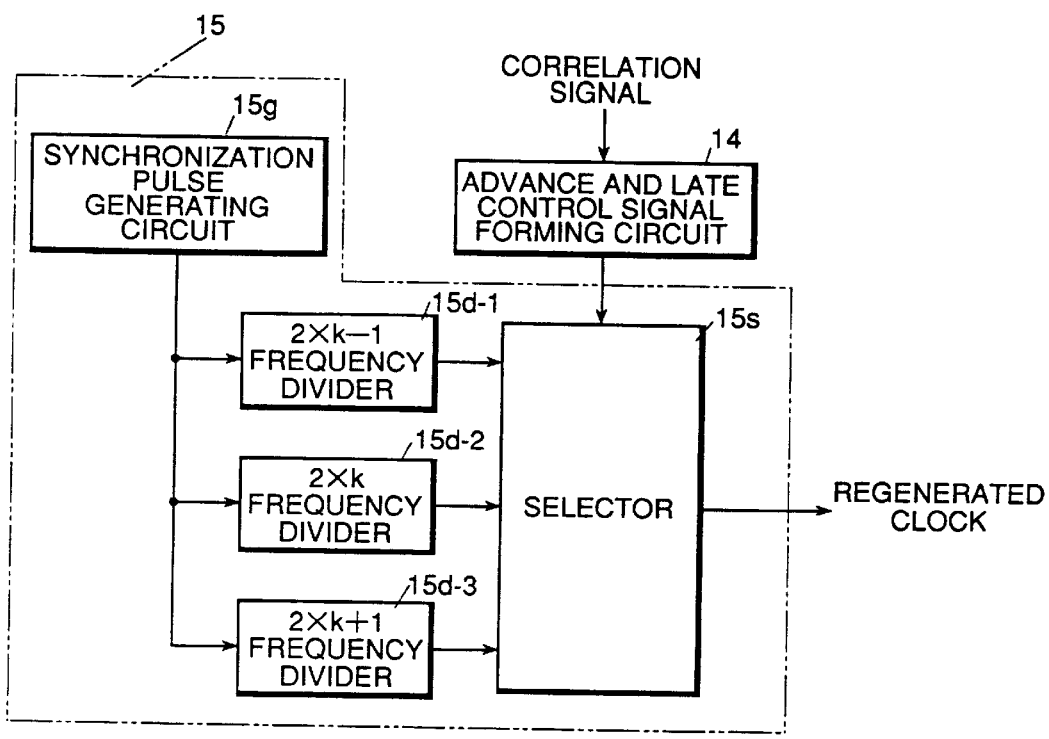
FIG. 13 is a circuit block diagram showing in detail a clock generator which is a component of the clock regenerating circuit in FIG. 12.

FIG. 13 shows the clock regenerator 15 shown in FIG. 12. The clock regenerator 15 generates a data clock by dividing the frequency of the sampling clock (which has been generated from the synchronization pulse generating circuit 15g and used for despreading) by 2×k frequency divider 15*d*–2 (k denotes the spread-code length). It is necessary to control the data clock since there are incorrect timing relationships between clock signals on the transmitting and receiving sides.

Control is carried out in this example as follows: When the adder 13-3 of the midpoint timing of the window has previously overflown, the current timing relationship of the clock regenerator 15 (the clock which is generated by 2×k frequency divider 15*d*-2) is maintained. On the other hand, the timing relationship of the clock regenerator 15 is delayed by one step (the clock which is generated by 2×k–1 frequency divider 15*d*-1) when the adder of the earlier timing relationship is overflown. Yet further, the timing relationship of the clock regenerator 15 is advanced by one step (the clock generated by 2×k+1 frequency divider 15*d*–3) when the adder of the late timing relationship is previously overflown. Tracking of regenerated clock is conducted in such a manner.

Alternative methods of shifting the timing relationship by two samples, by a weighing method, or by adding by every sample, etc. are envisioned.

Figure 14:
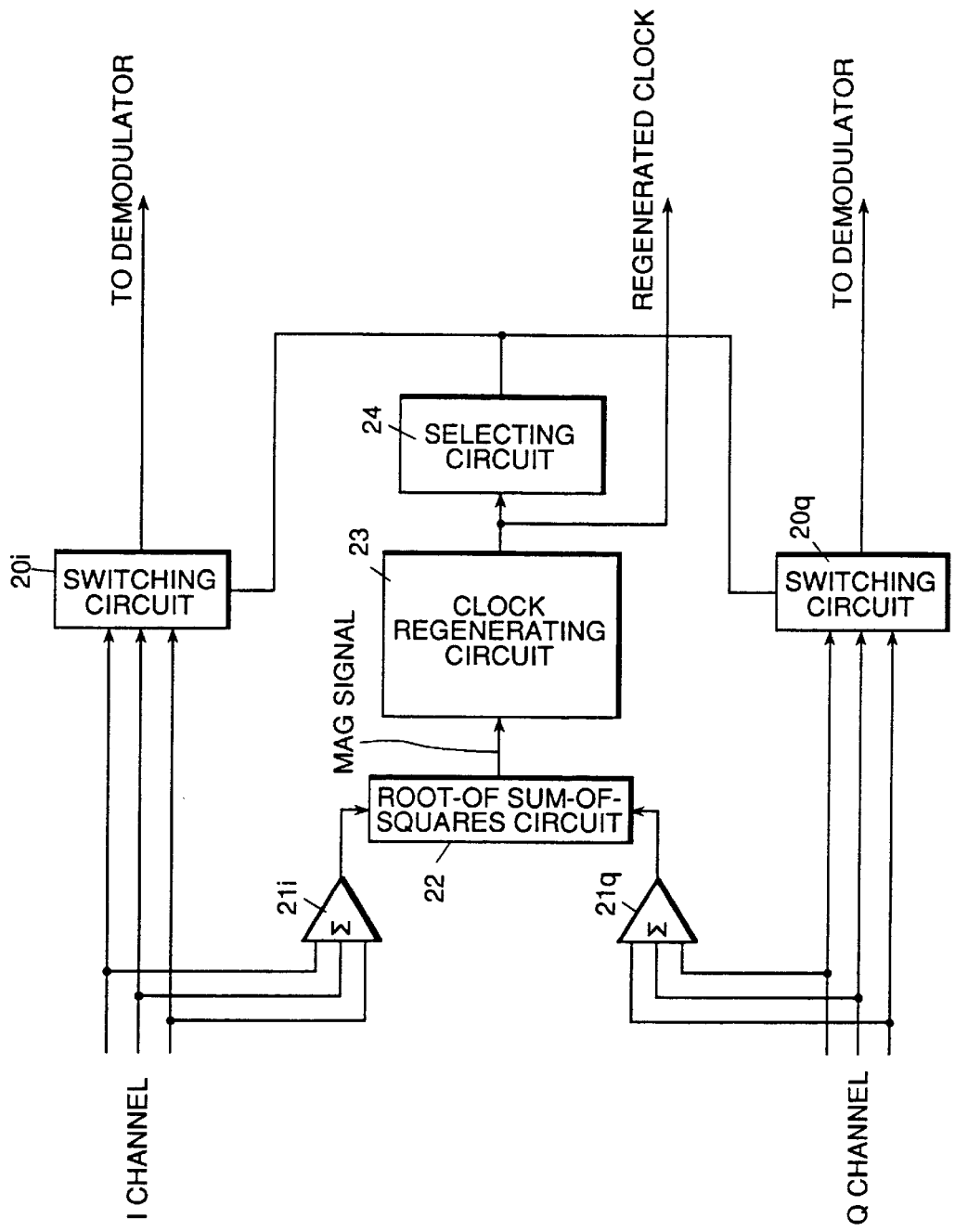
FIG. 14 is a circuit block diagram showing the configuration of a circuit for carrying out a method of selecting sampling clock signals in correlation processing in accordance with the present invention.
Figure 16A:
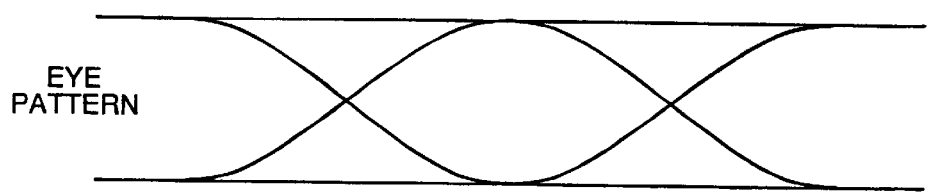
FIG. 16A–FIG. 16G are time charts showing another condition of an eye pattern of base band signals, sample signals, clock regeneration and magnitude (MAG) outputs in operation of the correlator of the present invention.
Figure 16B:
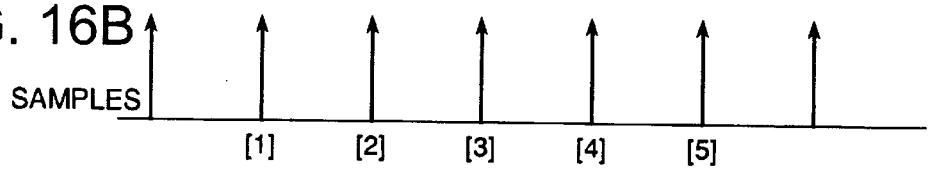
Figure 16C:
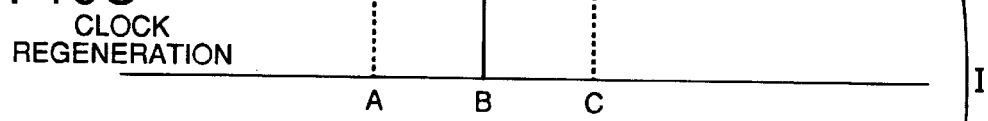
Figure 16D:
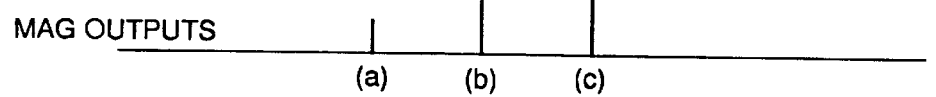
Figure 16E:
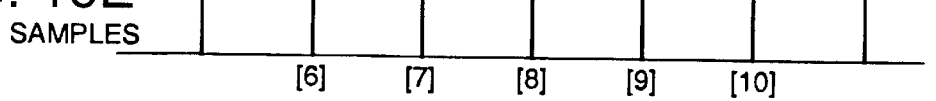
Figure 16F:
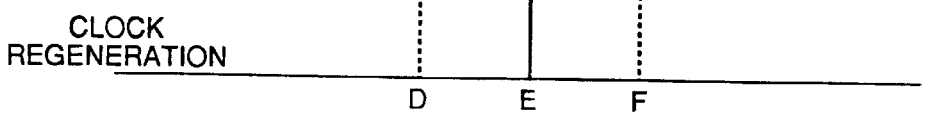
Figure 16G:
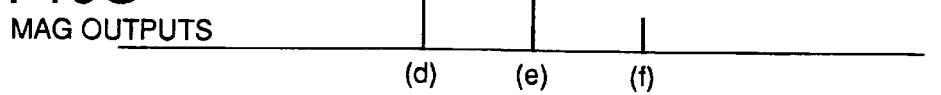

The circuit configuration for carrying out the selecting method using clock regenerating circuit 15 is shown in FIG. 14. In the receiver, I and Q signals are separately sampled by sampling means (not shown) and are input to the correlator in the embodiment of the present invention shown in FIG. 11.

As previously described, three outputs are output from the correlator as output addition signals for three samples; two outputs are output in the case of two samples. The addition signal on three channels which is output from the correlator is divided into two signals so that one is input to switching circuits 20*i*, 20*q* and the other is input to adders 21*i*, 21*q* for adding signals on three channels. A signal representing an absolute value of the amplitude (referred to as MAG signal) is generated by calculating the root of the sum of the squares of I and Q addition signals by a root-of-sum-of-squares circuit 22. This MAG signal is input to the above-mentioned clock regenerating circuit 23. The clock regenerating circuit 23 conducts comparison between previous and subsequent correlation outputs for holding clock signals as mentioned above.

Now, the selecting method will be described in case of two and three samples. The method in case of two samples is shown in FIG. 15. In this case, two samples are sampled per chip. The sampling timing relationships I and II, different from each other, are illustrated. In the timing relationship I (see FIG. 15B–FIG. 15D), sampling is conducted at [1], [2], [3], [4] as shown in FIG. 15B.

On the other hand, an addition result, i.e., the sum of correlation outputs at [1] and [2] is obtained at A (as shown in FIG. 15C) in the clock regenerating circuit 23. An addition result of correlation outputs at [2] and [3] is obtained at B (see FIG. 15C). An addition result of correlation output [3] and [4] is obtained at C (see FIG. 15C). Accordingly, the MAG outputs which are addition outputs are obtained with its amplitude as shown at (a), (b) and (c) (see FIG. 15D). A clock signal at B is held.

In this case, a sample corresponding to a larger area of the eye pattern is selected among samples [2] and [3]. Since the MAG output (a) is a sum of the correlation outputs at sampling times [1] and [2] and no timing relationship is established at [1], its amplitude is substantially zero. Correlation is established at [2], but the sample is in the narrow area of the eye pattern and its amplitude is so low that its correlation output is low in proportion with the amplitude of the sample.

On the other hand, the MAG output (c) is a sum of the correlation outputs at [3] and [4] (see FIG. 15C) and no correlation is established at [4] and the amplitude of the output at C is substantially zero. Thus, a correlation is established at [3] and the eye of the eye pattern is largely opened and its correlation output is larger in proportional to the amplitude of the sample [3].

As a result, comparison between the MAG outputs (a) and (c) shows that the output (c) is larger.

Although the sample (a) may sometimes become larger than the sample (c) and vice versa due to occasional data and/or noise, the sample (c) can be made always larger by subjecting the samples to an integration for a given period of time.

Figure 1:
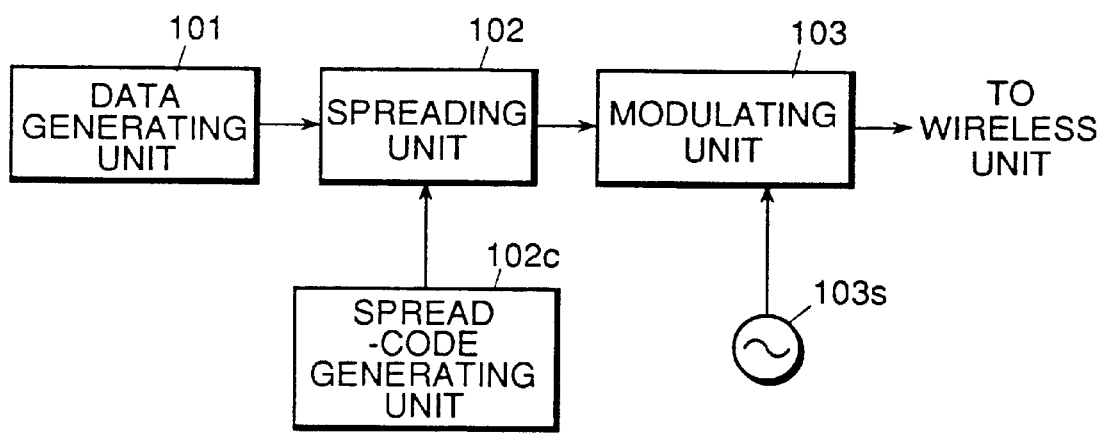
FIG. 1 is a block diagram for explaining the configuration of the general spread spectrum communication system on the transmitter side.
Figure 2:
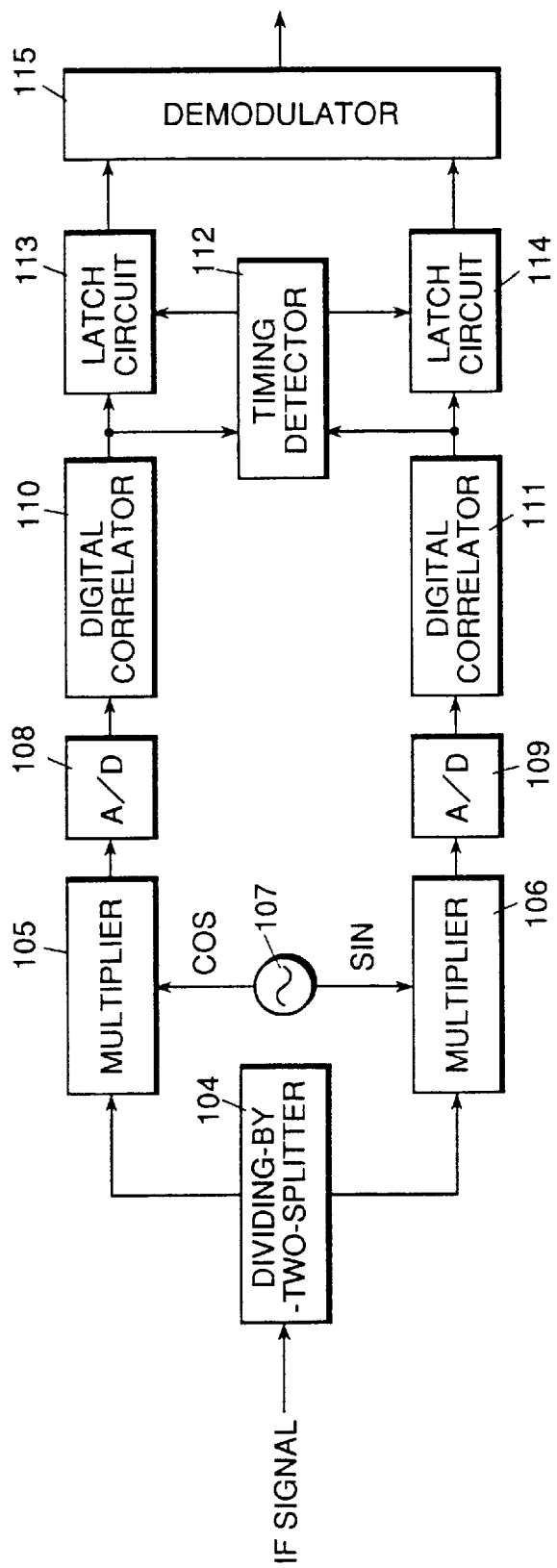
FIG. 2 is a block diagram for explaining the configuration of the general spread spectrum communication system on the receiver side.
Figure 4:
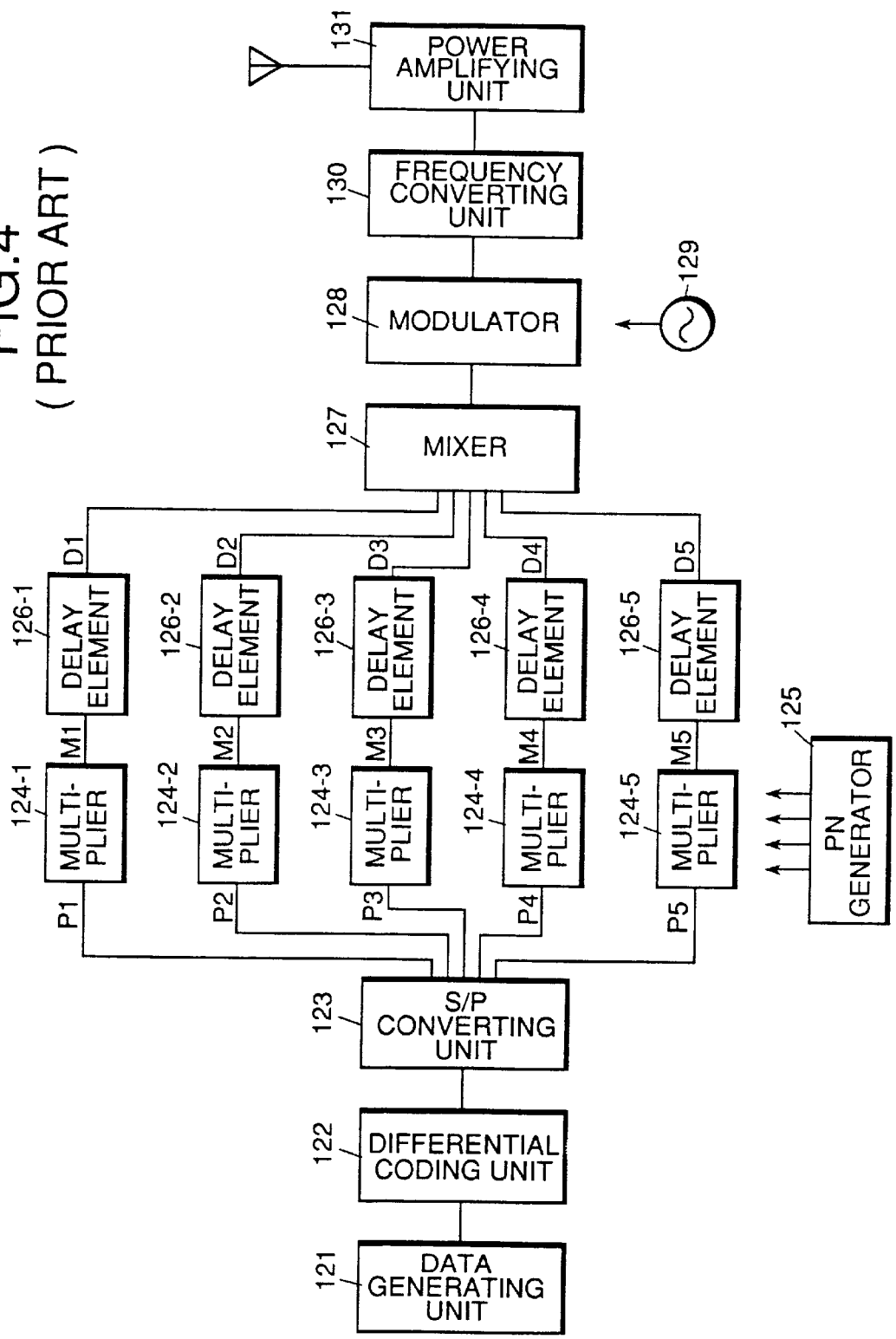
FIG. 4 is a block diagram showing an example of the prior art circuit configuration of a system for delaying and multiplexing by spreading with the same code in the direct spread spectrum communication.
Figure 5:
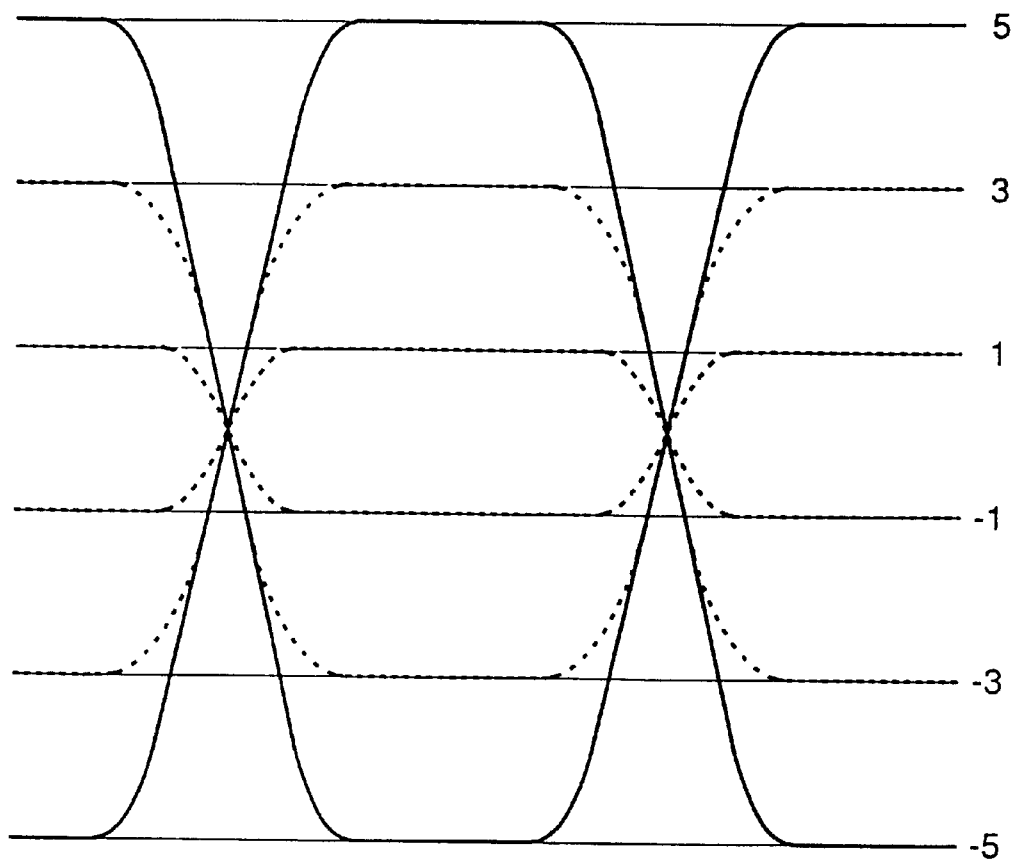
FIG. 5 is a time chart showing eye patterns of multiplexed base band signals in FIG. 4.

In the timing relationship II, sampling is conducted at [5], [6], [7], [8] (see FIGS. 15E–15G). An addition result of correlation outputs at [5] and [6] is obtained at D in the clock regenerating circuit 23 (see FIG. 1SE and FIG. 15F). An addition result of correlation outputs at [6] and [7] is obtained at E. An addition result of correlation output [7] and [8] is obtained at F. Accordingly, the MAG outputs which are addition outputs are obtained with its amplitude as shown at (d), (e) and (f) (see FIG. 15G). A clock signal at E is held.

In this case, a sample corresponding to a larger area of the eye pattern is selected among samples [6] and [7]. Since the MAG output (d) is a sum of the correlation outputs at sampling times [5] and [6] and no timing relationship is established at [5], its amplitude is substantially zero. Correlation is established at [6], but the sample is in the larger area of the eye pattern.

On the other hand, the MAG output (f) is a sum of the correlation outputs at [7] and [8]. No correlation is established at [8] and the amplitude of the output is substantially zero. A correlation is established at [7] and the eye of the eye pattern is smaller and its correlation output is smaller in proportional with the low amplitude of the sample.

As a result, comparison between the MAG outputs (d) and (f) shows that the output (d) is larger (see FIG. 15G).

In such manner, the selecting circuit 24(see FIG. 14) of the present invention compares the MAG outputs which are previous and subsequent of the sampling time to which the clock regeneration is referenced and selects a larger MAG output. If the previous output is larger, the previous sample of two samples would be closer to the center area of the eye pattern. If the subsequent output is larger, the subsequent sample of two samples is closer to the center area of the eye pattern.

The selecting circuit 24 switches switching circuits 20*i*, 20*q* to select samples used for demodulation in such a manner.

The method in case of three samples is shown in FIG. 16. The sampling timing relationships I and II, being different from each other, are also illustrated. In the timing relationship I (see FIG. 16B–FIG. 16D), sampling is conducted at [1], [2], [3], [4] and [5] (see FIG. 16B).

On the other hand, an addition result of correlation outputs at [1], [2] and [3] is obtained at A in the clock regenerating circuit. An addition result of correlation outputs at [2], [3] and [4] is obtained at B. An addition result of correlation output [3], [4] and [5] is obtained at C. Accordingly, the MAG outputs which are addition outputs are obtained with amplitude as shown at (a), (b) and (c) (see FIG. 16D). A clock signal at B is held.

In this case, a sample corresponding to a larger area of the eye pattern is selected among samples [2], [3] and [4].

Since the MAG output (a) is a sum of the correlation outputs at sampling times [1], [2] and [3] and no timing relationship is established at [1], its amplitude is substantially zero. Correlation is established at [2] and [3].

On the other hand, the MAG output (c) is a sum of the correlation outputs at [3], [4] and [5]. No correlation is established at [5] and the amplitude of the output is substantially zero. A correlation is established at [3] and [4]. The MAG output (b) is a sum of the correlation outputs at [2], [3] and [4] and a correlation is established.

When an odd number of samples are sampled, the time at which the amplitude of the eye pattern is largest is coincident with the time of clock regeneration. As a result, sampling in the timing relationship of clock regeneration is selected by the selecting circuit 24.

In the timing relationship II (see FIG. 16E–FIG. 16G), sampling is conducted at [6], [7], [8], [9] and [10]. An addition result of correlation outputs at [6], [7] and [8] is obtained at D. An addition result of correlation outputs at [7], [8] and [9] is obtained at E. An addition result of correlation output [8], [9] and [10] is obtained at F. Accordingly, the MAG outputs which are addition outputs are obtained with its amplitude as shown at (d), (c) and (f) (see FIG. 16G). A clock signal at E is held.

When an odd number of samples are sampled, the time at which the amplitude of the eye pattern is largest is coincident with the time of clock regeneration. As a result, sampling in the timing relationship of clock regeneration is selected by the selecting circuit 24. Also in this case, the time when the amplitude of the eye pattern is highest is coincident with the time of clock regeneration. As a result, the selecting circuit 24 selects sampling at time of clock regeneration.

Only a sampled signal which corresponds the highest amplitude of the eye pattern can be selected among independently sampled signals in accordance with the present invention. As a result, an improvement in error rate characteristics can be achieved in comparison with the case in which all samples are added.

Although the invention has been described with reference to only embodiments using two and three samples, the present invention can be equally embodied by using four, five samples, etc.

If an even number of samples are sampled, a larger sample is selected by comparing the MAG outputs at times before and after the center of the clock regeneration, similarly to the case of two samples. If the previous sample is larger than the subsequent sample, the previous sample is selected. If subsequent sample is larger, this sample is selected.

Figure 17A:
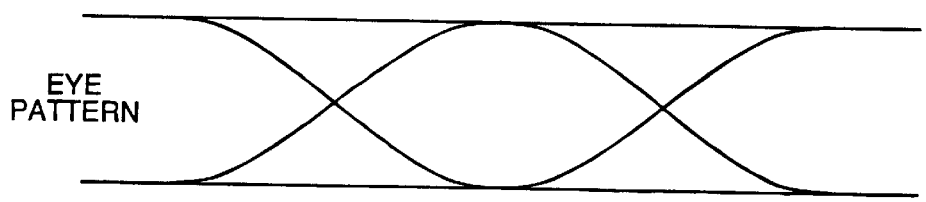
FIG. 17A–FIG. 17G are time charts showing a further condition of an eye pattern of base band signals, sample signals, clock regeneration and magnitude (MAG) outputs in operation of the correlator of the present invention.
Figure 17B:
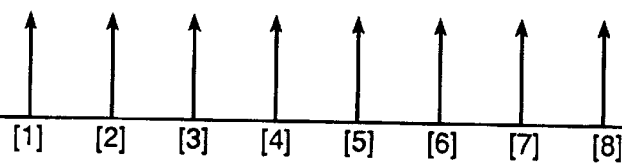
Figure 17C:
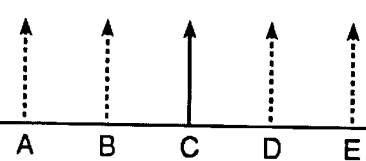
Figure 17D:
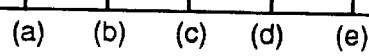

In case of four samples, the two samples which are previous and subsequent to consecutive two samples may be compared to each other since two consecutive samples give an influence to the previous and subsequent samples. This case is illustrated in FIG. 17B–17D.

This case is a case of sampling of an even number of samples in which four samples are sampled to one chip. Sampling is conducted at [1], [2], [3], [4], [5], [6], [7] and [8] (see FIG. 17B).

On the other hand, in the clock regenerating circuit 23, the addition result of the correlation outputs at [1], [2], [3] and [4] is output at A, the addition result of the correlation outputs at [2], [3], [4] and [5] is output at B, the addition result of the correlation outputs at [3], [4], [5] and [6] is output at C, the addition result of the correlation outputs at [4], [5], [6] and [7] is output at D, and the addition result of the correlation outputs at [5], [6], [7] and [8] is output at E. The MAG outputs which are addition outputs with its amplitude as shown at (a), (b), (c), (d) and (e) (see FIG. 17D). A clock signal is held at C.

A sample which corresponding to the highest amplitude of the eye pattern is also selected from the samples at [3], [4], [5], [6] in this case. The samples [4] and [5] are in the vicinity of the midpoint of the eye pattern. Since the subsequent MAG output is larger, subsequent sample, the sample at [5] will be selected.

Alternatively, two samples may be selected from four samples. In this case, samples at [4] and [5] may be selected. Only two samples at [4] and [5] of the selected results are added and used for demodulation.

It is understood that this method can be equally used in case of an even number of samples. On the other hand, when an odd number of samples are sampled, a sample corresponding to the midpoint of the eye pattern can be selected by using the timing relationship of the clock regeneration.

Figure 17E:
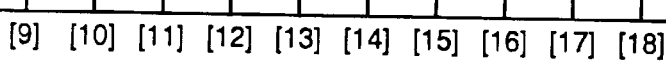
Figure 17F:
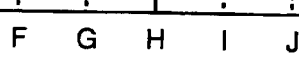
Figure 17G:
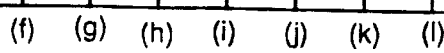

An example of sampling of 5 samples is illustrated in FIG. 17E–17G. Sampling is conducted at [9], [10], [11], [12], [13], [14], [15], [16], [17] and [18] (see FIG. 17E). On the other hand, in the clock regenerating circuit 23, the addition result of the correlation outputs at [10], [11], [12], [13] and [14] is output at F, the addition result of the correlation outputs at [11], [12], [13], [14] and [15] is output at G, the addition result of the correlation outputs at [12], [13], [14], [15] and [16] is output at H, the addition result of the correlation outputs at [13], [14], [15], [16] and [17] is output at I, and the addition result of the correlation outputs at [14], [15], [16], [17] and [18] is output at J. The MAG outputs which are addition outputs with its amplitude as shown at (f) to (l) (see FIG. 17G). A clock signal is held at H.

A sample corresponding to the highest amplitude of the eye pattern is also selected from the samples at [12], [13], [14], [15] and [16] in this case. Also in this case, the time when the amplitude of the eye pattern is highest is coincident with the time of clock regeneration. As a result, sampling in the timing relationship if clock regeneration is selected by the selecting circuit 24. In such a manner, the clock regeneration timing relationship may be used for five (odd number) samples sampling to one chip.

If three samples, etc. are used of five samples, the results of selection at [13], [14] and [15] are added and used for demodulation.

Figure 18:
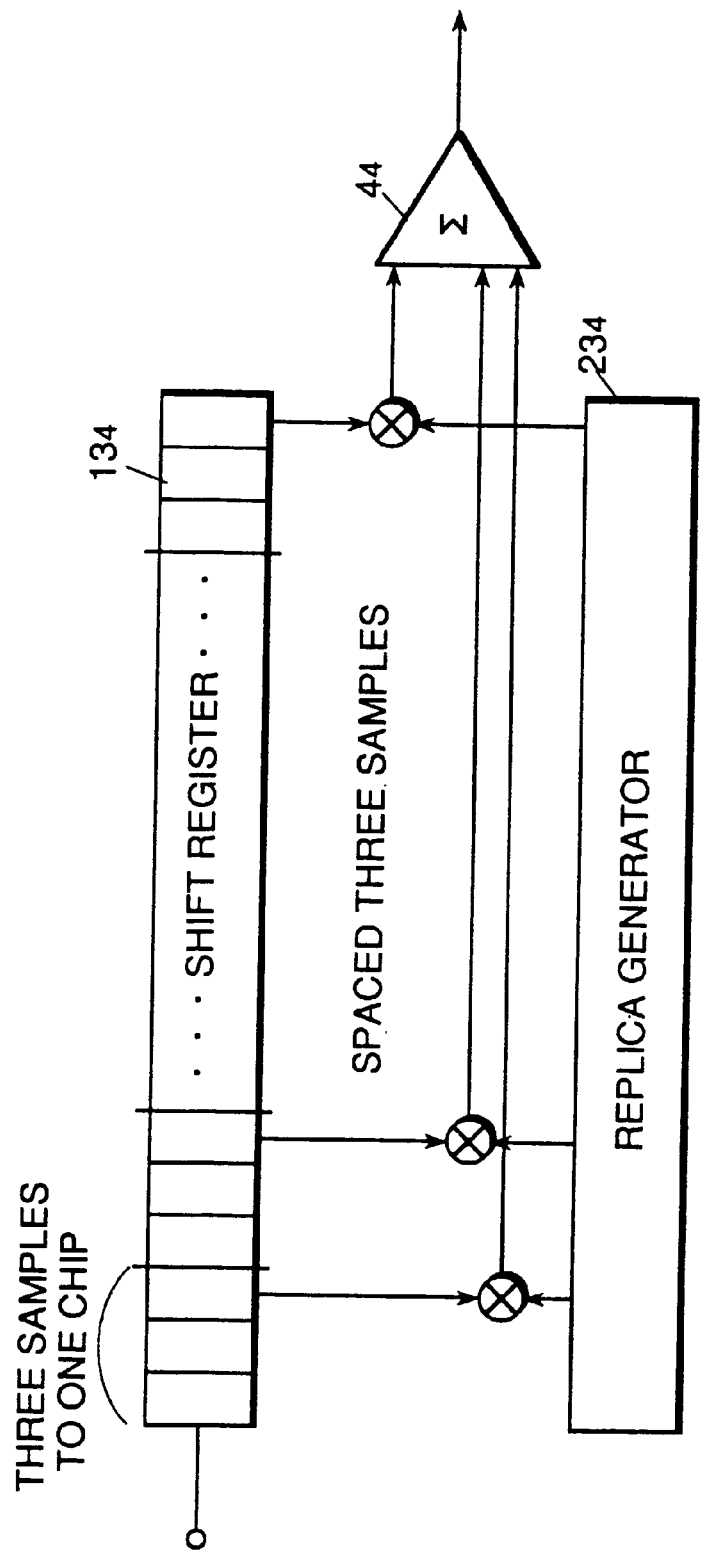
FIG. 18 is a circuit block diagram showing the configuration of an embodiment of a further correlator of the present invention.
Figure 19:
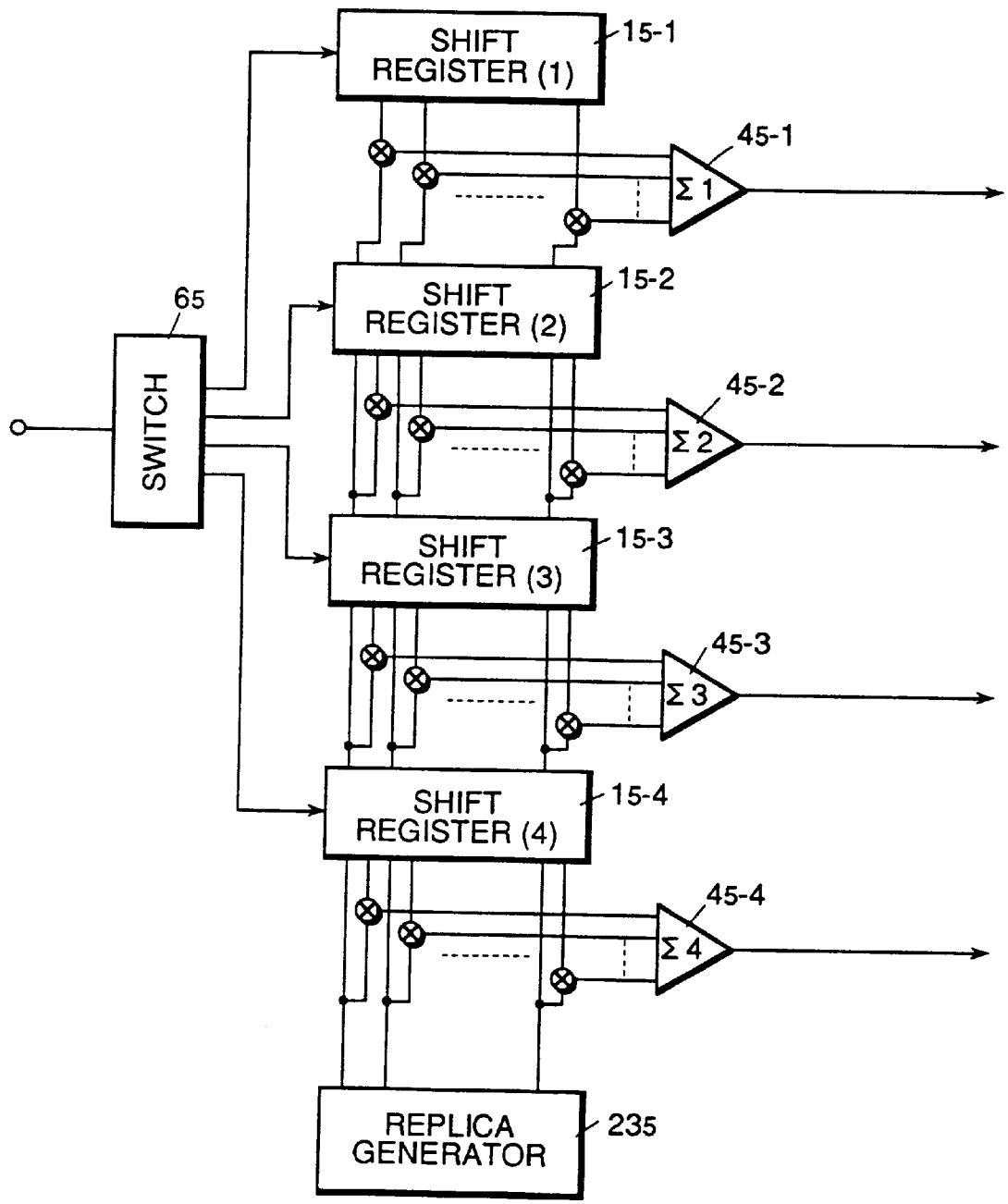
FIG. 19 is a circuit block diagram showing the configuration of an embodiment of a further correlator of the present invention.

Further embodiments are illustrated in FIGS. 18 and 19 for the correlator for extracting data from the serial type shift registers shown in FIG. 11 each time of sampling in the foregoing description.

A correlator which carries out addition at each time of sampling is shown in FIG. 18. Reference numeral 234 depicts a replica-generator having spreading code data.

Although addition is conducted in the exemplified embodiment of FIG. 11 at each sample to one chip and addition operations (3m+1), (3m+2), (3m+3) are separately performed, an equal operation result can be obtained by performing addition every other sample or samples.

The value which is stored in the shift register $13_4$ at t is shifted by one sample at t+1.

For example, if an addition of (3m+1) is performed at t by performing every three samples, an output of (3m+2) can be obtained from an adder $4_4$. As result which is equal to that of FIG. 11 is obtained.

A method of using a parallel type of correlator as shown in FIG. 8 is used is shown in FIG. 19. Switch $6_5$ and parallel shift registers 1$_5$-1 through 1$_5$-4 are provided, as well as replica generator 23$_5$ and adders 4$_5$-1 through 4$_5$-4. Since results of addition of each block of samples are output in a parallel manner in this case, they can be directly used. The addition results Σ1, Σ2, Σ3, Σ4 of respective adders 4$_5$-1 to 4$_5$-4 are sums of every samples. Thus, an equal result can be obtained. Since a total sum of Σ1, Σ2, Σ3, Σ4 is required for clock regeneration per se, the total sum can be obtained as a correlation output by adding these four sums.

Now, another embodiment of the clock regenerating circuit of the present invention will be described wherein the clock regenerating signal is used without processing it in the manner of the foregoing embodiment. For example, when an odd number of samples are sampled, selection is performed with reference to the timing relationship which is identical to the clock regeneration timing relationship.

However, the value at which overflow of the adder in FIG. 12 occurs is often preset considerably larger for eliminating variations due to noise and/or phasing since the clock error between the transmitter and receiver is adjusted by the clock regenerating circuit and the clock signal on only either one of the transmitter and receiver is certainly advanced and the same shift of clock frequency occurs.

It is an object of the clock regeneration per se to regenerate correct clock signals rather than to capture the center of the eye pattern.

Figure 20:
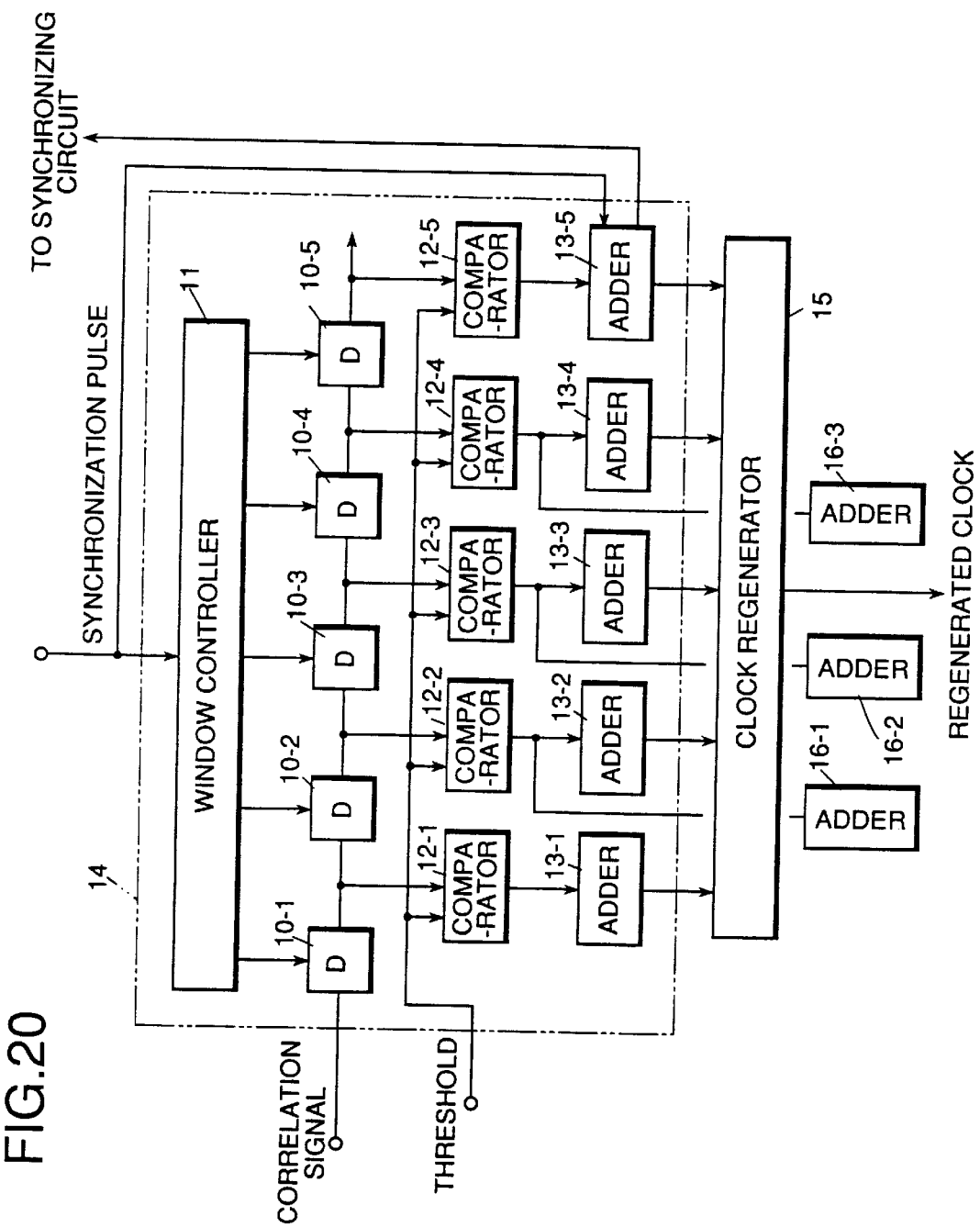
FIG. 20 is a circuit block diagram showing the configuration of the clock regenerating circuit of the present invention used for selecting sample signals, which is added with another adders.

The embodiment of FIG. 20 shows correlation 14 connected to clock regenerator 15. Correlator 14 includes delay registers 10-1 through 10-5, which feed comparators 121 through 12-5, respectively. Outputs from comparators 12-1 through 12-5 are applied to adders 13-1 through 13-5 respectively. The present embodiment has a feature, as shown in FIG. 20, that the adders 13-1 to 13-5 of the clock signals are separate from the selecting adders 16-1 to 16-3 so that their overflow can be changed.

Figure 21A:
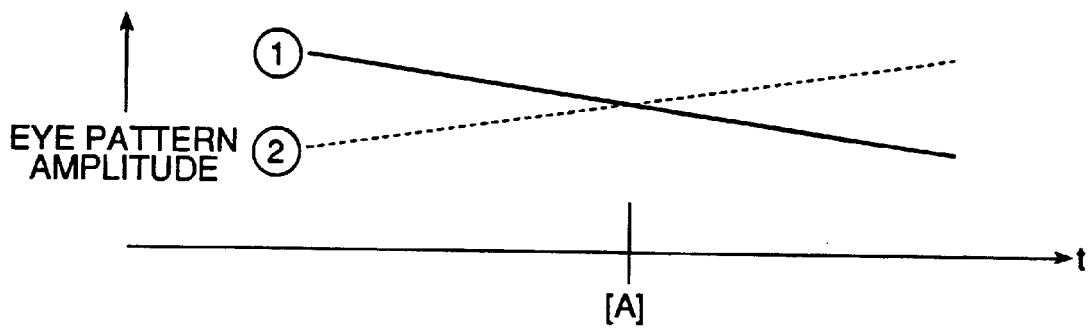
FIG. 21A–FIG. 21C are time charts showing the amplitude of eye patterns at two sampling times for explaining the operation of the present invention.

Changes in amplitude of the eye pattern and the manner of switching is shown in FIG. 21. Lines ① and ② in FIG. 21(a) denote changes in amplitude of the eye pattern in adjacent timing relationships. As shown in FIG. 21(a), the eye pattern in the timing relationship depicted by line ② becomes larger in amplitude with lapse of time and exceeds it at time [A] due to a shift of clock signals. Ideally switching occurs at [A]. Since integration operations are performed in adders for eliminating clock changes due to noise and/or phasing, the eye patterns can not be quickly switched.

Figure 21B:
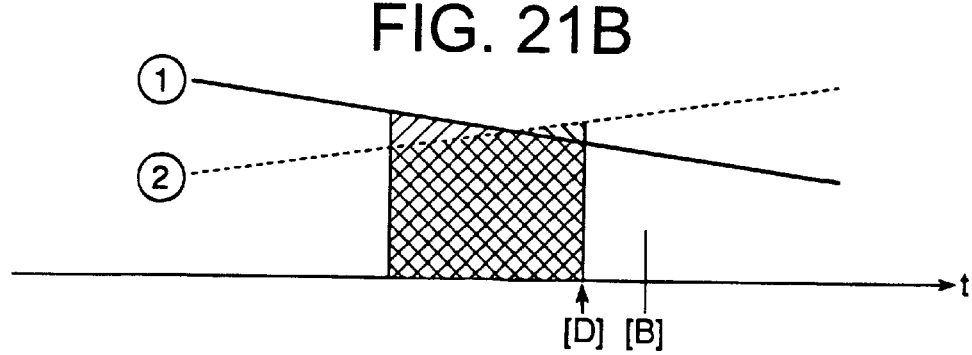

A case in which the integration period of time is longer is shown in FIG. 21(b). The integrated value of the area under line ① (right hand hatched area) is larger than that under line ② (left hand hatched area) even at time [D]. The integrated value under line ② subsequently becomes larger than that under line ① at time [B].

Figure 21C:
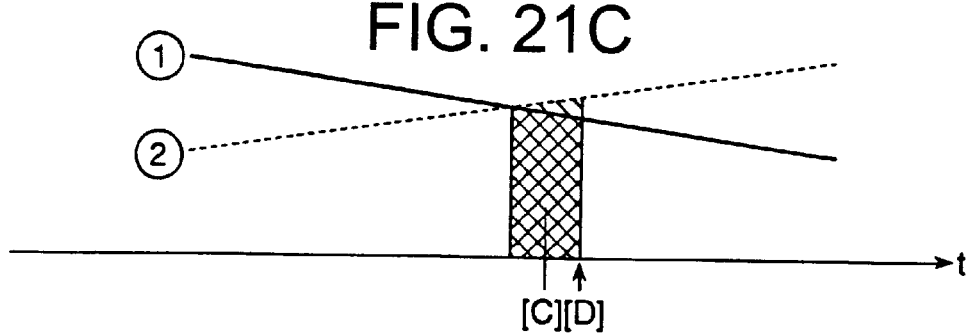

On the other hand, a case in which the integration period of time is made shorter is shown in FIG. 21(c). In this case, since the integration period of time is shorter, the addition result under line ② becomes larger at [C]. It is possible to switch earlier.

Since the integration period of time is larger to keep stability in the clock regenerating circuit, the time of switching is inevitably late, resulting in a switching timing relationship as shown in FIG. 21(b).

Therefore, the present invention decreases the number of integration operations by providing adders which are devotedly used for selecting to provide the characteristics to enable rapid switching.

Although the present embodiment has been described with reference to the clock regenerating circuit comprising adders using comparators, the present embodiment can be modified to change the integration load in all integration methods used in the clock regenerating circuit which was invented by the present inventors.

Although the above embodiment has a feature that the number of integration operations performed in adders is changed in the clock regenerating circuit, the number of integration operation may be externally controlled depending upon transmission rate. In this regard, and as is generally known, the quartz crystal oscillators having a stability of several ppm to about 100 ppm used for generating clock are commercially available. Their stability is selected depending upon application.

If 10 MHz is obtained by a quartz crystal oscillator having a frequency stability of 10 ppm, the frequency offset would be 100 Hz.

If sampling is conducted at 10 MHz, the sample may be shifted to an adjacent sample after sampling of 100,000 samples. Thus, the number of integration operations is changed accordingly. A frequency of 1 MHz which is obtained by dividing the frequency from a 10 MHz oscillator is used for sampling some systems. In this case, a sample may be shifted to adjacent sample after sampling of 10,000 samples.

In such a manner, an optimal integration load differs depending upon the stability of used oscillator, frequency, sampling frequency, data rate, spreading rate, etc. Hence, the present embodiment has a feature that the integration load is preliminarily preset based upon these parameters and the integration load is changed depending upon the use conditions.

In the communication system, data rate, spreading rate, etc. are changed. Optimal switching can be performed by changing the number of integration times depending upon these parameters.

The present inventors of the present application have proposed an invention for eliminating cross interference on duplexing in a delayed multiplexing system (Japanese Patent Application No. 8-47118). The proposed invention aims at eliminating interference by blocking the multiplexed signals, using the correlation values therebetween and performing operation on the values. Accordingly, in order to improve the characteristics, it is required that there is not rapid changes between blocked signals. On the other hand, the sampling timing relationship which is selected when the integrated value becomes a constant if the clock regeneration is used or said adders are used. Accordingly, the sampling timing relationship is changed for a period of blocked signals, resulting in a deterioration on demodulation.

Figure 22:
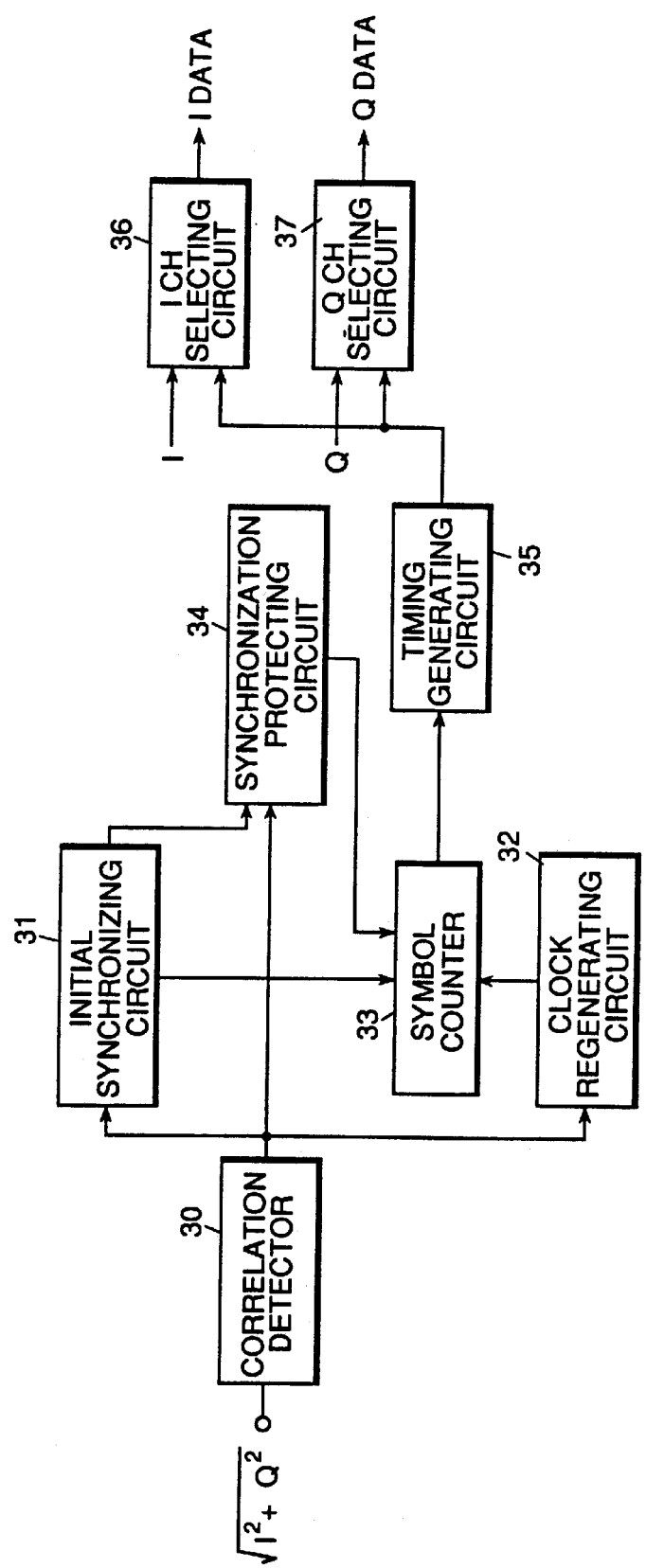
FIG. 22 is a circuit block diagram showing an example of the configuration of an embodiment of the demodulating device of the present invention.

Therefore, the present invention has a feature that the time of switching of the selected sampling is changed at a transition of each block of signals. This configuration is illustrated in FIG. 22. The circuit of FIG. 22 includes a correlation detector 30 which feeds each of an initial synchronizing circuit 31; synchronization protecting circuit 34; and clock regenerating circuit 32. A symbol counter 33 is connected to receive inputs from each of initial synchronizing circuit 31; synchronization protecting circuit 34; and clock regenerating circuit 32, and to output a signal to timing generating circuit 35. The output of timing generating circuit 35 is applied to I channel selecting circuit 36 for the outputting of the signal I DATA and Q channel selecting circuit 37 for the outputting of the signal Q DATA.

In a demodulating system for spread spectrum communication, a correlation synchronizing circuit 31 is always necessary in addition to the clock regenerating circuit 32 so that synchronization of correlation is established. In the FIG. 22 embodiment, the correlation synchronizing circuit has a correlation symbol counter 33, the leading edges of blocked signals can be detected. Switching of selecting circuits can be conducted each block of signals by controlling the timing relationship in response to a signal from the symbol counter 33. As a result, switching of selecting circuits is conducted each in unit of block so that reduction in cross interference on multiplexing in the multiplexing system which is proposed by the present inventors, is effectively achieved.

In the above-mentioned embodiment, a method of selecting the number of samples has been described and a method of selecting one or in samples from several samples to one chip has been described. Optimal characteristics can be obtained at an optimum power consumption by determining the number of samples depending upon the number of signals to be sampled and selecting one sample or m samples among the determined number of samples.

Advantageous effects according to the present invention as follows:
(1) The demodulating device of the present invention can be operated to sample a given number of samples in view of power consumption and characteristics. The device has means for changing the number of samples in response to a control signal. A communication system which is optimal for mobile application can be built.
(2) The correlator of the present invention controls each of its components depending upon the number of samples. The correlation processing can be performed by using a method in which the shift registers for distributing received spread signal inputs are in series connected to each other or a method in which the shift registers, each for several samples are in parallel connected to each other. Therefore, a system in which reduction in power consumption can be achieved by changing the number of samples depending upon the characteristics can be built.
(3) In addition to the advantageous effect of (1) mentioned above, optimal characteristics can be obtained by changing the number of samples per chip depending upon the multi-valued number (if the transmitted signal has a multi-valued signal level in which several spread signals are added as is done in code division multiplexing).
(4) In addition to advantageous effect of (1) mentioned above, optimal characteristics can be obtained at both non-multiplexed and multiplexed portions by switching the number of samples per chip between the non-multiplexed portion and the multiplexed portion in a system for transmitting plural series of signals which are multiplexed. Alternatively, signals carrying the number of signals to be multiplexed may be transmitted and the number of signals to be multiplexed is identified on the receiving side. The number of samples can be switched from the multiplexed portion depending upon the identified number of signals to be multiplexed.
(5) Demodulation can be performed only in an region having a better C/N ratio by using one sample or m samples per chip of signals which are sampled by sampling several samples (k samples) (k>m) per one chip. This results in reduction in error rate on demodulation.
(6) In addition to advantageous effect of (5) mentioned above, using a clock regenerating circuit for regenerating the clock signal as means for selecting sample signals makes it possible to select much better region having a much better C/N ratio.

A circuit can be commonly used by obtaining the despread signals by adding signals which are despread one sample by one sample.

(7) In addition to advantageous effects of (6) mentioned above, if an even number of samples (for example, two samples per one chip) are sampled, a larger MAG output is selected from previous and subsequent samples with respect to the midpoint of an eye pattern. A sample which is in a region having a better C/N ratio of an eye pattern can be positively selected by selecting a previous or a subsequent sample if the previous sample is larger than the subsequent sample or vice versa.
(8) In addition to advantageous effect of (6) mentioned above, if an odd number of samples (for example, three samples per one chip) are sampled, a region of an eye pattern having a better C/N ratio can be positively selected by performing sampling in the timing relationship of clock regeneration.
(9) In addition to advantageous effects of (6) to (8) mentioned above, the integration for selection can be switched more rapidly by being replaced with the integration for clock regeneration.

The number of integration operations can be switched depending upon the system with reference to the accuracy of the oscillator used for the communication system, data rate and spreading rate.
(10) In addition to advantageous effects of (6) to (9) mentioned above, cancellation of cross interference can be performed in an excellent manner by selecting each unit of multiplexed block in a system in which transmitted and received signals are multiplexed.
(11) A system having a low power consumption and excellent characteristics can be built by combining a method of selecting signals used for demodulation from sampled signals with the method of selecting the number of samples by means of the demodulating device of the present invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A demodulating device in a direct sequence spread spectrum communication system having sampling means for sampling a given number of samples to one chip from input spread signals in a baseband frequency range, which are directly spread with a spread-code, wherein the number of samples to one chip can be controlled in response to a control signal, and wherein a control signal is generated for controlling the number of samples depending upon a multi-valued number of the signal level of the input spread signals.

2. A demodulating device in the direct sequence spread spectrum communication system as defined in claim 1, further comprising:
   a number of in-series-connected shift registers being inputted with the samples. the number of which is equal to the maximum number of samples to one chip;
   replica signal generating means for generating a number of replica signals, the number of which is equal to the number of samples to the same chip as replica of the reference spread signal; and,
   a multiplier for multiplying the sample signals by the replica signals.

3. A demodulating device in the direct sequence spread spectrum communication system as defined in claim 1, further comprising:
   a number of in-parallel-connected shift registers being inputted with discrete sample signals, the number of which is equal to the maximum number of samples to one chip;

replica signal generating means for generating a number of replica signals, the number of which is equal to the number of samples to the same chip as replica of the reference spread signal; and, a multiplier for multiplying the sample signals by the replica signals.

4. A demodulating device in the direct sequence spread spectrum communication system as defined in claim 1, wherein a signal in a predetermined data format includes a non-multiplexed portion containing data for defining the communication format and a multiplexed portion, wherein when the signal in the predetermined data format is input as the input spread signals, a control signal for controlling the number of samples is generated by using a multi-valued number which is obtained by identifying the multi-valued number which has been incorporated in the non-multiplexed portion.

5. A demodulating device in a direct sequence spread spectrum communication system having sampling means for sampling a driven number of samples to one chip from input spread signals in a baseband frequency range, which are directly spread with a spread-code, wherein the number of samples to one chip can be controlled in response to a control signal, wherein a signal in a predetermined data format includes a non-multiplexed portion containing data for defining the communication format and a multiplexed portion, wherein when the signal in the predetermined data format is input as the input spread signals, a control signal is generated for controlling the number of samples, the number of samples being one of (1) preset in the non-multiplexed portion or (2) dependent upon a the multi-valued number which the signal level of multiplexed spread signal has in the multiplexed portion.

6. A demodulating device in a direct sequence spread spectrum communication system adapted to perform despreading based upon discrete sample signals the demodulation device comprising:

means for sampling a driven number of samples from one chip of input spread signals in a baseband frequency range;

sample signal selecting means for selecting a number of samples, the number of which is less than the said given number of samples from one chip of input direct sequence spread spectrum signals obtained by the sampling means to despread only sample signals selected by said sample signal selecting means, wherein the sample signal selecting means selects sample signals in such a timing relationship that a correlation signal is generated, which is detected in a clock regenerating circuit for regenerating sampling clock signals based upon despread signals which are obtained by an addition operation which involves adding correlation signals based on all sample signals which are sampled by the sampling means.

7. A demodulating device in the direct spread spectrum communication system as defined in claim 6, wherein the addition operation is performed.

8. A demodulator device in the direct spread spectrum communication system as defined in claim 6, wherein when despreading is performed by sampling an even number of samples to one chip and by using a passive type of correlator, a sample signal is selected which corresponds to larger one of previous and subsequent correlation MAG outputs with respect to the midpoint of a timing interval in which correlation signals which are detected by the clock regenerating circuit are generated.

9. A demodulator device in the direct spread spectrum communication system as defined in claim 6, wherein when despreading is performed by sampling an odd number of samples to one chip and by using a passive type of correlator, discrete sample signals are selected in a clock timing relationship in which correlation signals which are detected by the clock regenerating circuit are generated.

10. A demodulating device in the direct spread spectrum communication as defined in claim 6, wherein the clock regenerating circuit comprises correlation signal integrating means for detecting the timing relationship in which correlation signal are generated and integrating means for selecting sample signals, which is separate from the integrating means for clock generating.

11. A demodulating device in the direct spread spectrum communication system as defined in claim 10, wherein the number of integration operations depending upon the discrete sample signals which are performed in the integrating means for selecting sample signals is determined and preset as a function of data rate and spreading rate, based upon the accuracy of an oscillator used in the communication system.

12. A demodulating device in a direct sequence spread spectrum communication system adapted to perform despreading based upon discrete sample signals the demodulation device comprising:

means for sampling a given number of samples from one chip of input spread signals in a baseband frequency range;

sample signal selecting means for selecting a number of samples, the number of which is less than the said given number of samples from one chip of input direct sequence spread spectrum signals obtained by the sampling means to despread only sample signals selected by said sample signal selecting means;

wherein when signals which have been spread by using the same spread-code, delayed and multiplexed are input as the input spread signals, the sample signals which are selected are changed each block unit of the delayed and multiplexed signals so that the condition of selecting of the sample signals is maintained for a period of the block unit.

13. A demodulating device in a direct sequence spread spectrum communication system adapted to perform despreading based upon discrete sample signals the demodulation device comprising:

means for sampling a given number of samples from one chip of input spread signals in a baseband frequency range;

sample signal selecting means for selecting a number of samples, the number of which is less than the said given number of samples from one chip of input direct sequence spread spectrum signals obtained by the sampling means to despread only sample signals selected by said sample signal selecting means;

wherein a control signal is generated for controlling a number of samples depending on a multi-valued number of a signal level of the input spread signals.

14. A demodulating device in a direct sequence spread spectrum communication system adapted to perform despreadino based upon discrete sample signals the demodulation device comprising:

means for sampling a given number of samples from one chip of input spread signals in a baseband frequency range;

sample signal selecting means for selecting a number of samples, the number of which is less than the said given number of samples from one chip of input direct sequence spread spectrum signals obtained by the sampling means to despread only sample signals selected by said sample signal selecting means;

wherein a signal in a predetermined data format includes a non-multiplexed portion containing data for defining the communication format and a multiplexed portion, wherein when the signal in the predetermined data format is input as the input spread signals, a control signal is generated for controlling the number of samples, the number of samples being one of (1) preset in the non-multiplexed portion or (2) dependent upon the multi-valued number which the signal level of multiplexed spread signal has in the multiplexed portion.

15. A demodulating device in a direct sequence spread spectrum communication system adapted to perform despreading based upon discrete sample signals the demodulation device comprising:

means for sampling a given number of samples from one chip of input spread signals in a baseband frequency range;

sample signal selecting means for selecting a number of samples, the number of which is less than the said given number of samples from one chip of input direct sequence spread spectrum signals obtained by the sampling means to despread only sample signals selected by said sample signal selecting means;

wherein a signal in a predetermined data format includes a non-multiplexed portion containing data for defining the communication format and a multiplexed portion, wherein when the signal in the predetermined data format is input as the input spread signals, a control signal for controlling the number of samples is generated by using a multi-valued number which is obtained by identifying the multi-valued number which has been incorporated in the non-multiplexed portion.

* * * * *